(12) United States Patent
Huang et al.

(10) Patent No.: US 12,026,857 B2
(45) Date of Patent: Jul. 2, 2024

(54) AUTOMATICALLY REMOVING MOVING OBJECTS FROM VIDEO STREAMS

(71) Applicant: Adobe Inc., San Jose, CA (US)

(72) Inventors: Sheng-Wei Huang, Richardson, TX (US); Wentian Zhao, San Jose, CA (US); Kun Wan, San Jose, CA (US); Zichuan Liu, San Jose, CA (US); Xin Lu, Mountain View, CA (US); Jen-Chan Jeff Chien, Saratoga, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/298,146

(22) Filed: Apr. 10, 2023

(65) Prior Publication Data

US 2023/0274400 A1 Aug. 31, 2023

Related U.S. Application Data

(63) Continuation of application No. 17/085,491, filed on Oct. 30, 2020, now Pat. No. 11,625,813.

(51) Int. Cl.
*G06T 5/77* (2024.01)
*G06F 18/2134* (2023.01)
(Continued)

(52) U.S. Cl.
CPC ............ *G06T 5/77* (2024.01); *G06F 18/2134* (2023.01); *G06T 7/73* (2017.01); *H04N 23/631* (2023.01);
(Continued)

(58) Field of Classification Search
CPC . G06T 5/005; G06T 7/73; G06T 2207/10016; G06T 2207/20081;
(Continued)

(56) References Cited

U.S. PATENT DOCUMENTS

2012/0320055 A1 12/2012 Pekar et al.
2018/0268527 A1* 9/2018 Schroers .............. G06V 10/273
(Continued)

OTHER PUBLICATIONS

Goodfellow, Ian and Pouget-Abadie, Jean and Mirza, Mehdi and Xu, Bing and Warde-Farley, David and Ozair, Sherjil and Courville, Aaron and Bengio, Yoshua, Generative adversarial nets, in Conference on Neural Information Processing Systems (NIPS) 2014.
(Continued)

*Primary Examiner* — Stephen P Coleman
(74) *Attorney, Agent, or Firm* — Keller Preece PLLC

(57) ABSTRACT

The present disclosure describes systems, non-transitory computer-readable media, and methods for accurately and efficiently removing objects from digital images taken from a camera viewfinder stream. For example, the disclosed systems access digital images from a camera viewfinder stream in connection with an undesired moving object depicted in the digital images. The disclosed systems generate a temporal window of the digital images concatenated with binary masks indicating the undesired moving object in each digital image. The disclosed systems further utilizes a generator as part of a 3D to 2D generative adversarial neural network in connection with the temporal window to generate a target digital image with the region associated with the undesired moving object in-painted. In at least one embodiment, the disclosed systems provide the target digital image to a camera viewfinder display to show a user how a future digital photograph will look without the undesired moving object.

20 Claims, 10 Drawing Sheets

(51) Int. Cl.
 G06T 7/73 (2017.01)
 H04N 23/63 (2023.01)
(52) U.S. Cl.
 CPC .............. *G06T 2207/10016* (2013.01); *G06T 2207/20081* (2013.01)
(58) Field of Classification Search
 CPC ............ G06K 9/624; H04N 5/232933; H04N 5/23216; H04N 5/232935; G06V 10/273; G06V 10/62; G06V 20/41
 USPC ......................................................... 348/241
 See application file for complete search history.

(56) References Cited

U.S. PATENT DOCUMENTS

| | | | |
|---|---|---|---|
| 2019/0197673 A1* | 6/2019 | Jung | G06T 7/248 |
| 2022/0044430 A1 | 2/2022 | Eckman et al. | |
| 2022/0129682 A1 | 4/2022 | Tang et al. | |

OTHER PUBLICATIONS

Iizuka, S., Simo-Serra, E., & Ishikawa, H. (2017). Globally and locally consistent image completion. ACM Transactions on Graphics, 36(4), 1-14. doi:10.1145/3072959.3073659.

Yu, J., Lin, Z., Yang, J., Shen, X., Lu, X., & Huang, T. S. (2018). Generative Image Inpainting with Contextual Attention. 2018 IEEE/CVF Conference on Computer Vision and Pattern Recognition. doi:10.1109/cvpr.2018.00577.

Liu, G., Reda, F. A., Shih, K. J., Wang, T., Tao, A., & Catanzaro, B. (2018). Image Inpainting for Irregular Holes Using Partial Convolutions. Computer Vision—ECCV 2018 Lecture Notes in Computer Science.

Yu, J., Lin, Z., Yang, J., Shen, X., Lu, X., & Huang, T. (2019). Free-Form Image Inpainting With Gated Convolution. 2019 IEEE/CVF International Conference on Computer Vision (ICCV). doi:10.1109/iccv.2019.00457.

Xu, R., Li, X., Zhou, B., & Loy, C. C. (2019). Deep Flow-Guided Video Inpainting. 2019 IEEE/CVF Conference on Computer Vision and Pattern Recognition (CVPR). doi:10.1109/cvpr.2019.00384.

Kim, D., Woo, S., Lee, J., & Kweon, I. S. (2019). Deep Video Inpainting. 2019 IEEE/CVF Conference on Computer Vision and Pattern Recognition (CVPR). doi:10.1109/cvpr.2019.00594.

Zhang, H., Goodfellow, I., Metaxas, D. & Odena, A.. (2019). Self-Attention Generative Adversarial Networks. Proceedings of the 36th International Conference on Machine Learning, in PMLR 97:7354-7363.

Miyato, T., Kataoka, T., Koyama, M., & Yoshida, Y. (2018). Spectral Normalization for Generative Adversarial Networks. 2018 International Conference on Learning Representations (ICLR).

Johnson, J., Alahi, A., & Fei-Fei, L. (2016). Perceptual Losses for Real-Time Style Transfer and Super-Resolution. Computer Vision—ECCV 2016 Lecture Notes in Computer Science, 694-711. doi:10.1007/978-3-319-46475-6 43.

Simonyan, K., & Zisserman, A. (2015). Very Deep Convolutional Net-works for Large-Scale Image Recognition. 4th International Conference on Learning Representations (ICLR).

Caelles, S., Montes, A., Maninis, K.K., Chen, Y., Van Gool, L., Perazzi, F., PontTuset, J.: The 2018 davis challenge on video object segmentation. arXiv preprint arXiv:1803.00557 (2018).

U.S. Appl. No. 17/085,491, Jul. 15, 2022, Office Action.
U.S. Appl. No. 17/085,491, Nov. 30, 2022, Notice of Allowance.

\* cited by examiner

AUTOMATICALLY REMOVING MOVING OBJECTS FROM VIDEO STREAMS

CROSS-REFERENCE TO RELATED APPLICATIONS

The present application is a continuation of U.S. application Ser. No. 17/085,491, filed on Oct. 30, 2020. The aforementioned application is hereby incorporated by reference in its entirety.

BACKGROUND

Recent years have seen significant improvements in digital image in-painting. For example, conventional systems can detect missing regions in a digital image and utilize sophisticated inpainting techniques to fill in the missing regions based on surrounding areas in the digital image. Conventional systems further apply these functions in connection with optical flow techniques to identify and remove objects from digital video frames. To illustrate, conventional systems can utilize optical flow techniques to estimate movement of an identified object over time in connection with a series of digital video frames. Conventional systems may then produce segmentations of the digital video frames based on the moving object, and in-paint the segmented regions to effectively erase the object.

Despite these advances, the optical flow approach and other approaches common to conventional systems gives rise to many issues with regard to accuracy, efficiency, and flexibility of operation. For instance, the optical flow approach utilized by conventional systems is inaccurate when applied to digital video. Specifically, optical flow inherently relies on static frame positioning in order to predict object movement in order to in-paint segmented regions including the moving object. When utilized in connection with non-static digital image frames—as with frames taken from a digital video that includes subtle camera movements—the optical flow approach utilized by conventional systems results in inaccurate object removal. For example, when utilized in connection with digital video frames, the optical flow approach generally results in "ghost" contours of the undesired object, blurry lines and backgrounds associated with the location of the undesired object, and other visual indicators of the unsuccessfully removed object.

Additionally, other approaches commonly utilized by conventional systems lead to inefficient uses of computing resources. For example, other approaches commonly utilized by conventional systems in connection with object removal from digital images include convolutional neural networks. To illustrate, convolutional neural networks are often utilized in imaging tasks because the convolutions preserve spatial relationships between pixels by learning image features in a digital image. Despite this, when applied to high-dimension digital image-such as digital image frames taken from a digital video-a standard or "vanilla" convolutional consumes vast amounts of the computing resources. As a result, a neural network including such standard convolutions requires excessive amounts of processing cycles and memory in order to remove a moving object from a series of digital video frames.

Moreover, optical flow and other approaches commonly utilized by conventional systems are inflexible. For instance, content encoders often utilized by conventional systems do not generalize to arbitrary—shaped regions of interest. Thus, when utilized in connection with moving object removal-such as a moving human who does not have the same shape in every frame of a digital video (e.g., due to moving arms and legs)—common approaches of conventional systems are too rigid to successfully synthesize and in-paint regions associated with the moving object because the shape of the moving object is arbitrary.

These along with additional problems and issues exist with regard to conventional systems.

BRIEF SUMMARY

Embodiments of the present disclosure provide benefits and/or solve one or more of the foregoing or other problems in the art with systems, non-transitory computer-readable media, and methods for accurately and efficiently removing moving objects from video streams (e.g., a live camera viewfinder stream). In particular, the disclosed systems take advantage of temporal information to reduce the size of larger missing regions (corresponding to the object to be removed) in a current video frame by borrowing non-overlapping regions from past image frames. The disclosed systems then utilize gated convolution layers to address the arbitrary but reduced-sized missing regions. The disclosed systems utilize a three-dimensional (3D) to two-dimensional (2D) convolution architecture and a generative adversarial framework that learns to extract and select features across time and generate complete predictions that have realistic and plausible textures (e.g., images with the moving object replaced).

In particular, in one or more embodiments, the disclosed systems utilize a 3D to 2D generative adversarial neural network to in-paint masked regions (e.g., regions corresponding to an object to be removed) of digital images extracted from a camera viewfinder stream. For example, the disclosed systems utilize the 3D to 2D generative adversarial neural network in connection with a sequence of digital images accessed from a camera viewfinder stream and concatenated with binary masks indicating an undesired moving object. The disclosed systems utilize the 3D to 2D generative adversarial neural network to generate a temporally-aggregated feature map that leverages temporal and spatial information to in-paint missing regions across the sequence of digital images. In one or more embodiments, the disclosed systems further decode and up-sample the temporally-aggregated feature map to generate a target digital image with the region of pixels associated with the undesired moving object in-painted-effectively erasing the undesired moving object from display.

Additional features and advantages of one or more embodiments of the present disclosure are outlined in the description which follows, and in part will be made clear from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
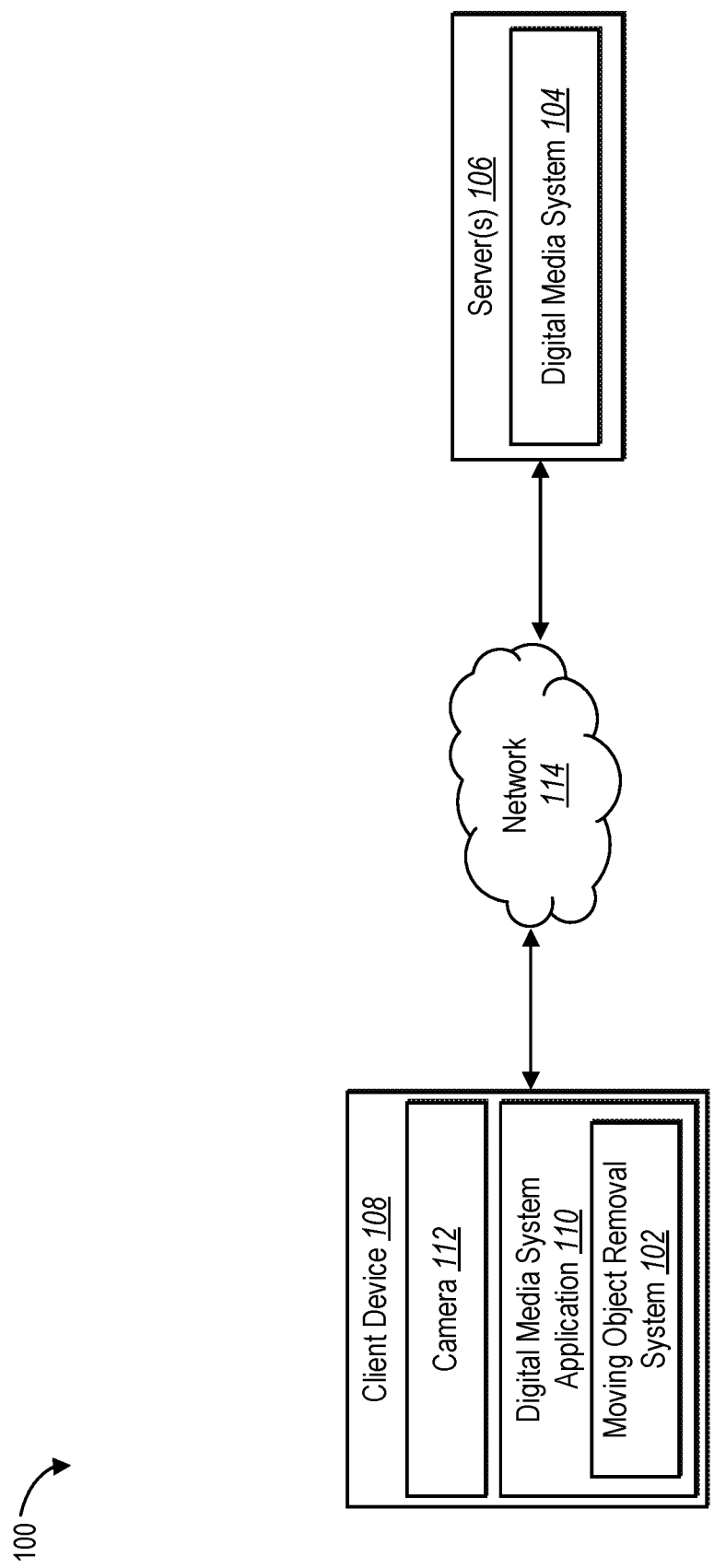
FIG. 1 illustrates a diagram of an environment in which a moving object removal system can operate in accordance with one or more embodiments.

One or more embodiments of the present disclosure include a moving object removal system that utilizes a 3D to 2D generator to remove undesired moving objects from video or sequences of images. In particular, the moving object removal system utilizes an encoder of the 3D to 2D generator to extract feature maps from a temporal sequence of images (e.g., video frames). The moving object removal system then utilizes deep-feature in-painting to fill-in deep features corresponding to a moving object in a feature map for a current image based on deep features from previous images in the temporal sequence. The moving object removal system then utilizes a decoder of the 3D to 2D generator to generate a modified version of the current image with the moving object removed and replaced by realistic content.

In more detail, the moving object removal system accesses a sequence of digital images depicting a moving object. For example, in at least one embodiment, the moving object removal system accesses the sequence of digital images in response to a detected user interaction with a camera viewfinder display selecting a particular object (e.g., selecting a "photo-bomber," selecting a person walking through the background of a group of people posing for a photograph) within the camera viewfinder stream for removal. The moving object removal system, for example, accesses a first digital image from the camera viewfinder stream corresponding to the detection of the user interaction (e.g., a camera viewfinder stream frame with which the user interaction was detected). The moving object removal system further accesses a threshold number of additional digital images from the camera viewfinder stream leading up to the first digital image. In at least one embodiment, the moving object removal system compiles the accessed digital images into a temporal window.

In one or more embodiments, the moving object removal system generates a binary mask for each digital image in the temporal window. For example, the moving object removal system generates a binary mask for a digital image by generating a monochromatic mask (e.g., where all the pixels in the mask are a single color) with pixel dimensions that match those of the digital image. The moving object removal system identifies pixels corresponding to the selected moving object in the digital image, and then inverts the color of a region of pixels in the binary mask that correspond to the identified pixels in the digital image. In at least one embodiment, the resulting binary mask includes an area of missing pixels (e.g., white pixels) in a location or region in the binary mask that corresponds to the location or region of the moving object in the corresponding digital image.

The moving object removal system further extracts feature maps from each of the digital images in the temporal window. For example, the moving object removal system generates a stacked tensor based on the digital images from the temporal window concatenated with corresponding binary masks. In one or more embodiments, the moving object removal system further utilizes a series of gated convolutions in a three-dimensional (3D) encoder of the 3D to two-dimensional (2D) generator to down-sample the stacked tensor while extracting spatial-temporal features from the stacked tensor. The 3D encoder further encodes the extracted spatial-temporal features into feature maps corresponding to the digital images in connection with corresponding binary masks. In at least one embodiment, the 3D encoder utilizes spatial-temporal features of neighboring digital images to fill-in missing feature across the feature maps associated with the digital images in the temporal window. In this manner, the 3D encoder may fill-in a portion of a missing region within a feature map representing a first digital image with information from feature maps from previous digital images, where the feature maps for the previous digital images have features in the same spatial region where the feature map for the first digital image is missing features due to the presence of the object to be removed.

Specifically, to reduce sizes of regions of missing information (e.g., representing the undesired moving object across the digital images in the temporal window) among the generated feature maps, the moving object removal system utilizes a temporal fusion layer of the 3D to 2D generator to generate a temporally-aggregated feature map. For example, the moving object removal system utilizes gated convolutions in the temporal fusion layer to generate the temporally-aggregated feature map representing a fusion of the individual feature maps. In one or more embodiments, the temporal fusion layer borrows information from neighboring digital images represented among the fused feature maps to further fill-in areas of missing information (e.g., deep feature infilling). The resulting temporally-aggregated feature map, for example, includes regions of missing information (e.g., missing features) of reduced size because missing information has been at least partially filled-in based on information (e.g., features) from neighboring feature maps.

In one or more embodiments, and in order to efficiently utilize computing resources, the moving object removal system utilizes the 3D encoder and temporal fusion layer of the 3D to 2D generator in connection with down-sampled inputs and a reduced receptive field. In at least one embodiment, to further refine the and improve the quality of the ultimate target image, the moving object removal system dilates the receptive field of the 3D to 2D generator so that further operations can capture global information. For example, the moving object removal system utilizes additional gated convolutions in a dilated convolution layer of the 3D to 2D generator to gradually increase the receptive field of the 3D to 2D generator until the receptive field is equal to the size of the digital images in the temporal window.

In at least one embodiment, the moving object removal system further refines the generation of the target image by utilizing a self-attention layer of the 3D to 2D generator in connection with the temporally-aggregated feature map prior to decoding and up-sampling the temporally-aggregated feature map into the target image. For example, the moving object removal system divides the temporally-aggregated feature map into patches, areas, or regions, and utilizes the self-attention layer of the 3D to 2D generator to determine and improve a correspondence or coordination between each region in the temporally-aggregated feature map and every other region in the temporally-aggregated feature map at a feature level.

The moving object removal system further generates a target digital image by decoding and up-sampling the temporally-aggregated feature map. For example, the moving object removal system utilizes one or more layers of gated convolutions in a decoder of the 3D to 2D generator to simultaneously up-sample and decode the spatial-temporal features of the temporally-aggregated feature map into the target digital image. To illustrate, in at least one embodiment, the decoder generates the target digital image to appear as one of the digital images from the temporal window (e.g., a last digital image from the temporal window) with the region of pixels previously associated with the undesired moving object replaced with pixels generated from the infilled deep features. In one or more embodiments, the resulting target digital image appears as though the undesired moving object was never present in the image. In other words, the moving object removal system generates the target digital image to appear as at least one of the digital images in the temporal window, but with a region of the digital image previously occupied by the undesired object replaced so that the region seamlessly blends in with surrounding areas in the digital image.

In order to accurately and efficiently generate the target image, the moving object removal system learns parameters for the 3D to 2D generator utilizing adversarial deep learning to help ensure that the 3D to 2D generator extracts and selects features across time to generate complete predictions that have realistic and plausible textures. For example, the moving object removal system utilizes the 3D to 2D generator to generate a synthesized digital image with a moving object replaced. The moving object removal system then uses a discriminator to predict whether the synthesized digital image is real or fake compared to a ground truth image. The moving object removal system updates the parameters of the 3D to 2D generator in a manner that the 3D to 2D generator learns to fool the discriminator into classifying synthesized digital images as real over corresponding ground truth digital images.

In at least one embodiment, the moving object removal system utilizes a discriminator (e.g., a spectral-normalization discriminator or SNGAN) to distinguish between positive samples (i.e., ground truth target digital images) and negative samples (e.g., synthesized digital images generated by the 3D to 2D generator). When learning the parameters of the 3D to 2D generator, the 3D to 2D generator learns to maximize a loss, while the discriminator learns to minimize the loss. In this manner, the moving object removal system constrains the 3D to 2D generator to efficiently aggregate temporal information and synthesize realistic texture patches in a target digital image-when an undesired moving object does not move drastically within the temporal window (i.e., when temporal information is sparse).

In one or more embodiments, the moving object removal system learns parameters for the 3D to 2D generator based on multiple loss functions. For example, to further refine the 3D to 2D generator, the moving object removal system learns parameters for the 3D to 2D generator utilizing a pixel loss function. The moving object removal system, for example, utilizes an L1 pixel distance function to determine pixel loss between missing regions of a synthesized digital image and a corresponding ground truth digital image, and where valid regions are normalized with their respective area size. The moving object removal system utilizes the resulting reconstruction loss to further train the 3D to 2D generator.

In one or more embodiments, the moving object removal system also learns parameters for the 3D to 2D generator based on a perceptual loss. For example, the moving object removal system utilizes an L1 feature distance function in connection with a synthesized digital image and a corresponding ground truth digital image on a feature level to determine the perceptual loss (e.g., a feature-level loss) between the synthesized digital image and the corresponding ground truth digital image.

In at least one embodiment, the moving object removal system learns parameters for the 3D to 2D generator by minimizing a combination of losses. For example, at every learning epoch, the moving object removal system combines two or more of the adversarial loss, the reconstruction loss, and the perceptual loss. The moving object removal system then backpropagates the combined loss to learn parameters of the 3D to 2D generator. Over multiple learning epochs, the moving object removal system continues back-propagation until the parameters of the 3D to 2D generator converge or the loss is minimized to a satisfactory degree.

The moving object removal system utilizes the resulting 3D to 2D generator in connection with various real-world applications. For example, in one application, the moving object removal system utilizes the 3D to 2D generator to preview edited results in a camera viewfinder before capturing a photo-rather than editing the photo after capture. In another application, the moving object removal system automatically detects one or more moving objects in a camera viewfinder stream (e.g., without a user selection of the one or more moving objects) and automatically generates and provides target digital images with the moving objects removed (e.g., as with surprise "photo-bombers").

As mentioned above, the moving object removal system provides many advantages and benefits over conventional systems and methods. For example, by utilizing gated convolutions across layers of the 3D to 2D generator in connection with a temporal window of masked digital images, the moving object removal system improves accuracy relative to conventional systems. Specifically, where the optical flow method relied upon by conventional systems requires static frame positions in order to predict in-painting regions associated with a moving object, the architecture of the 3D to 2D generator accurately and seamlessly in-paints regions in digital images even when camera motion is apparent-such as with digital images taken from digital video frames (e.g., as part of a camera viewfinder stream). Accordingly, when the optical flow method would result in inaccurate removal of the undesired object (e.g., leaving behind "ghost" contours and other distortions and artifacts), the 3D to 2D generator generates plausible digital images with the in-painted regions maintaining realistic textures and contours.

Additionally, by utilizing gated convolutions across the layers of the 3D to 2D generator, the moving object removal system vastly increases the efficiency of a computing system in which the 3D to 2D generator operates. For example, the traditional or "vanilla" convolutions commonly utilized in imaging tasks by conventional systems require large amounts of computing resources when used in connection with high-dimensional digital images. This is because, when used in the fully-connected layers of a convolutional neural network, these "vanilla" convolutions pass forward all information relative to the digital image-including information associated with missing regions of the digital image (e.g., as with a masked region). Instead of further propagating this waste, the 3D to 2D generator utilizes gated convolutions that apply filters to convolutional outputs in order to extract and/or learn useful information (e.g., information associated with non-missing regions). Thus, the 3D to 2D generator requires less in terms of processing cycles and memory units than the more commonly utilized approaches that rely on "vanilla" convolutions because the 3D to 2D generator focuses its analysis on a useful portion of a masked digital image, rather than on the whole which may include useless information.

Moreover, by remaining agnostic with regard to moving object shape, the 3D to 2D generator is flexible, while other approaches commonly utilized by conventional systems remain rigidly tied to static object shapes. For example, as discussed above, the 3D to 2D generator extracts and utilizes information and features tied to non-missing regions of digital images in a temporal window in order to synthesize or in-paint a missing region within a target digital image. As such, the 3D to 2D generator is well-suited to in-paint missing regions of any shape or changing shapes. Conversely, other approaches generally extract and utilize information associated with all regions of a digital image to perform in-painting. Accordingly, when the region of the masked object is arbitrary across digital images, these other approaches fail to borrow correct information across spatial-temporal channels-producing sub-standard results where distortions and artifacts are apparent.

As illustrated by the foregoing discussion, the present disclosure utilizes a variety of terms to describe features and advantages of the moving object removal system. Additional detail is now provided regarding the meaning of such terms. For example, as used herein, the term "digital image" refers to an encoding of an image in either vector or raster format. To illustrate, a digital image can include a digital photograph (e.g., a ".jpg" file, a ".tiff" file, a ".gif" file, a ".png" file) with a length and a width and including areas of colored and/or grey scale pixels. In one or more embodiments, a digital image may be represented in Red-Green-Blue format (RGB format).

As used herein, the term "digital video" refers to an electronic representation of visual images over time. For example, a digital video can include sequence of digital images captured at a frame rate (e.g., 8 frames per second for more) such that when watched in succession, objects depicted in the digital images appear to move. In at least one embodiment, digital video may be streamed from a client device in the form of a camera viewfinder stream. For example, the camera viewfinder stream can include digital video depicting a current view of at least one of the cameras of the client device.

As used herein, a "temporal window" refers to a predetermined number of digital images. For example, a temporal window can include a predetermined number of digital images from the same source (e.g., from the same digital video, from the same camera viewfinder stream). The predetermined number of digital images (e.g., five digital images) can be sequential or non-sequential, and can include both stationary and moving artifacts or objects. The predetermined number of digital images can be stationary and/or can include camera movement. Each of the predetermined number of digital images can depict the same artifacts (e.g., people and/or objects), or may depict different artifacts.

As used herein, the terms "binary mask" and/or "monochromatic binary mask" refer to a single-colored mask of pixels with a length and width that corresponds to a length and width of a corresponding digital image. In one or more embodiments, a binary mask and/or monochromatic binary mask further includes one or more regions of pixels where the color of pixels in the regions is inverted (e.g., from black to white) to indicate one or more features in the corresponding digital image. For example, the binary mask and/or monochromatic binary mask with black pixels can include a region of white pixels in a location or region that corresponds to a location or region of a specific object in the corresponding digital image. In at least one embodiment, the region of white pixels has a shape that follows an outline of the specific object in the corresponding digital image.

As used herein, an "object" refers to anything that can be depicted in a digital image. For example, an object can be one or more people, one or more animals, one or more vehicles, and/or any other type of object. In at least one embodiment, an object is anything that is capable of movement relative to one digital image compared to a next digital image in a sequence (e.g., a moving person, a moving vehicle, a moving animal, a moving ball).

As used herein, a "generative adversarial neural network" (GAN) refers to a deep learning model that is enabled to learn to generate a target result. For example, the moving object removal system utilizes a 3D to 2D generative adversarial neural network that includes a 3D to 2D generator and a discriminator. In one or more embodiments, the moving object removal system learns parameters of the 3D to 2D generator to generate a target digital image based on a temporal window of digital images. The moving object removal system further utilizes the discriminator to classify digital image inputs as either real (e.g., ground truth digital images) or fake (e.g., synthesized digital images generated by the 3D to 2D generator. The moving object removal system learns the parameters of the 3D to 2D generator and the discriminator together in an adversarial manner until the discriminator mis-classifies (e.g., is fooled by) synthesized digital images from the 3D to 2D generator more often than not-meaning that the 3D to 2D generator is generating plausible target digital images.

In one or more embodiments, the "3D to 2D generator" refers to a convolutional neural network that receives a temporal window of digital images, with one or more depicting a moving object, and outputs a target digital image with the region associated with the moving object replaced based on deep-feature in-painted. For example, the 3D to 2D generator includes layers that encode an input temporal window into a feature space, perform one or more operations in connection with the feature space, and decodes the feature space into a target digital image. As used herein, "spatial-temporal features" refer to features within the encoded feature space that can be borrowed across digital images in the temporal window to fill-in information associated with missing or masked regions (e.g., representing the undesired object).

Turning now to the figures, FIG. 1 illustrates a schematic diagram of one embodiment of an exemplary environment 100 in which a moving object removal system 102 operates. In one or more embodiments, the exemplary environment 100 includes at least one client device 108 a network 114, and server(s) 106. The network 114 may be any suitable network over which computing devices communicate. Example networks are discussed in more detail below with regard to FIG. 10.

As illustrated in FIG. 1, the environment 100 may include the client device 108. The client device 108 may comprise any computing device. For instance, in one or more embodiments, the client device 108 comprises one or more computing devices described below in relation to FIG. 10.

In addition, the environment 100 may also include the server(s) 106. The server(s) 106 generates, stores, receives, and transmits any type of data, including a 3D to 2D generative adversarial neural network, learning digital images and pre-determined binary masks, and/or a 3D to 2D generator of a 3D to 2D generative adversarial neural network. For example, the server(s) 106 generates the 3D to 2D generative adversarial neural network, and then provides the 3D to 2D generator of the 3D to 2D generative adversarial neural network to the client device 108 for local use. In at least one embodiment, the server(s) 106 also comprises a communication server or a web-hosting server. Additional details regarding the server(s) 106 will be discussed below with respect to FIG. 10.

As shown in FIG. 1, the server(s) 106 includes a digital media system 104. In one or more embodiments, the digital media system 104 includes an implementation of software, hardware, or both for managing one or more digital images. For example, in one or more embodiments, the digital media system 104 comprises software that maintains, manages, shares, and/or provides a digital images in connection with the client device 108 and stored at the server(s) 106.

As further shown in FIG. 1, the client device 108 includes a camera 112. In one or more embodiments, the camera 112 includes one or more of front-facing cameras or rear-facing cameras. Similarly, the camera 112 includes one or more of a standard camera, a wide-angle camera, or a telephoto camera. In at least one embodiment, the camera 112 captures digital video, which the client device then displays in the form of a camera viewfinder stream including a succession of digital image frames with a predetermined frame rate (e.g., 24 frames per second).

Additionally, the client device 108 includes a digital media application 110. In one or more embodiments, the digital media application 110 includes an implementation of software, hardware, or both for managing one or more digital images in connection with the digital media system 104 on the server(s) 106. For example, the digital media application 110 interfaces with the camera 112 to provide functionality in connection with a camera viewfinder stream associated with the camera 112.

As illustrated, in one or more embodiments, the client device 108 (and/or the digital media application 110) can include all, or a portion of, the moving object removal system 102. In particular, the moving object removal system 102 can comprise an application running on the client device 108 (as part of the digital media application 110) or a portion of a software application that can be downloaded from the server(s) 106. Although FIG. 1 illustrates a particular arrangement of the client device 108, the network 114, and the server(s) 106, various additional arrangements are possible. For example, while FIG. 1 illustrates the moving object removal system 102 located on the client device 108, in alternative embodiments, part of all of the moving object removal system 102 may be located on the server(s) 106 as part of the digital media system 104.

Figure 2A:
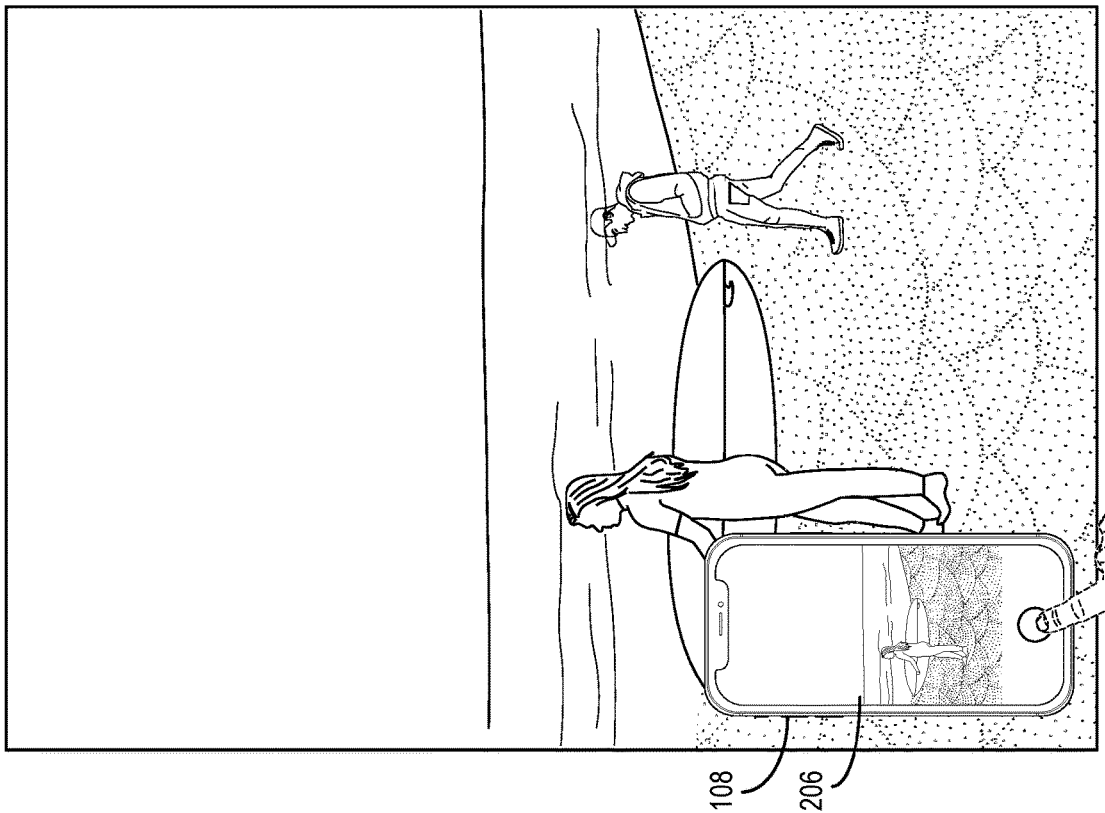
FIGS. 2A-2B illustrate the moving object removal system generating a camera viewfinder preview of a digital image with a moving object removed in accordance with one or more embodiments.
Figure 2B:
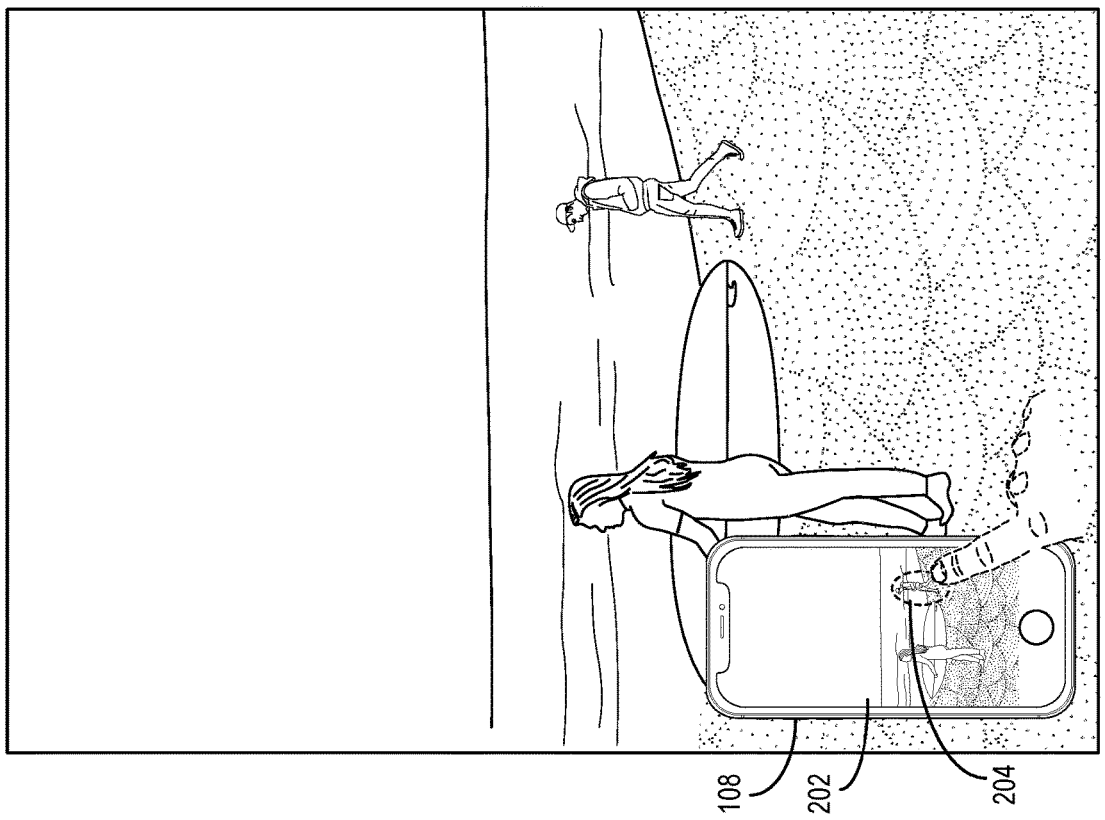

FIGS. 2A and 2B illustrate the moving object removal system 102 generating a camera viewfinder preview of a digital image with an undesired object removed. For example, as shown in FIG. 2A, the moving object removal system 102 detects a user selection of an undesired moving object 204 (e.g., a person walking through the background of the photo) in a camera viewfinder display 202 of the client device 108. In response to the detected user selection, the moving object removal system 102 accesses a temporal window of digital images from a camera viewfinder stream displayed by the camera viewfinder display 202, and generates binary masks indicating the location of the person walking through the background of each digital image in the temporal window. The moving object removal system 102 further utilizes a 3D to 2D generator to generate a target digital image with the region associated with the selected person in-painted such that the walking person no longer appears in the target digital image.

As further shown in FIG. 2B, the moving object removal system 102 then provides the target digital image 206 to the camera viewfinder display 202 as part of a live camera video stream. In at least one embodiment, the moving object removal system 102 repeats this process until a photo capture is detected (e.g., in response to a detected selection of a photo capture button) such that, from the time the user selection of the undesired moving object 204 is detected, the moving object removal system 102 replaces the camera viewfinder stream in the camera viewfinder display 202 with a series of target digital images (i.e., with a slight time-shift) with the undesired moving object 204 removed. Thus, the moving object removal system 102 provides an efficient and effective preview of what the resulting photo would like with the undesired moving object 204 removed, and enabling the user of the client device 108 to capture the displayed target digital image as a digital photograph (e.g., by selecting a shutter button via the camera viewfinder display 202). In an alternative embodiment, the moving object removal system 102 provides a single target digital image via the camera viewfinder display 202 (e.g., rather than providing a series of updated target digital images).

Figure 3:
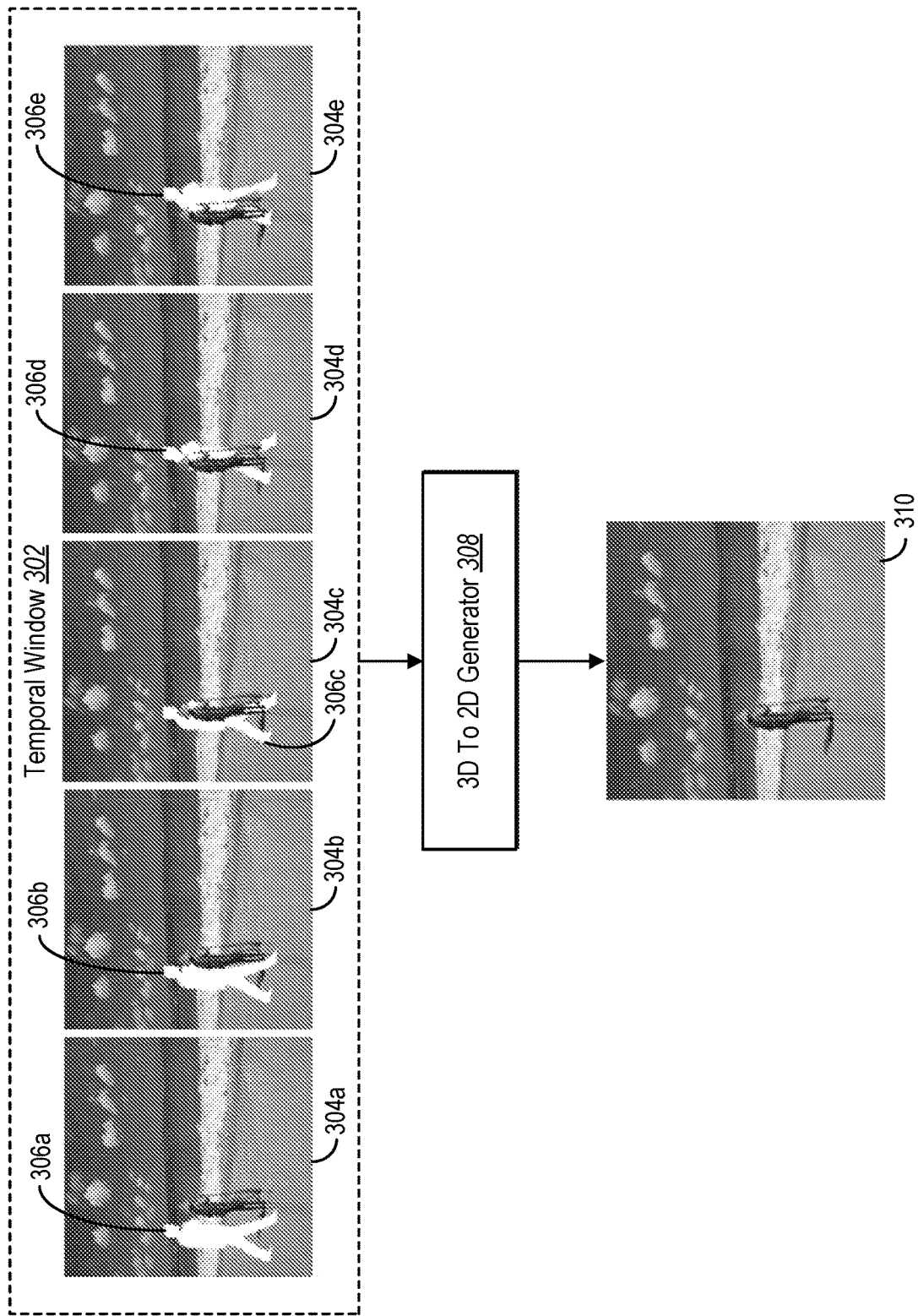
FIG. 3 illustrates an overview of the moving object removal system generating a target digital image based on a temporal window including a sequence of digital images in accordance with one or more embodiments.

FIG. 3 illustrates an overview of the moving object removal system 102 generating a target digital image based on a temporal window including a sequence of digital images. In particular, the moving object removal system 102 generates a temporal window 302 including a threshold number of digital images 304a, 304b, 304c, 304d, and 304e, concatenated with corresponding binary masks 306a, 306b, 306c, 306d, and 306e. The moving object removal system 102 further utilizes a 3D to 2D generator 308 in connection with the temporal window 302 to generate a target digital image 310. In one or more embodiments, as shown in FIG. 3, the moving object removal system 102 generates the target digital image 310 to include at least one of the digital image 304a-304e from the temporal window 302 with a missing region of pixels previously indicated by the corresponding binary mask in-painted-thereby removing or erasing an undesired moving object (e.g., a person walking past in the background) from the target digital image 310.

In more detail, as shown in FIG. 3, the moving object removal system 102 generates the temporal window 302 including digital images 304a-304e. In one or more embodiments, the moving object removal system 102 accesses the digital images 304a-304e from a digital video. For example, each of the digital images 304a-304e comprises a digital video frame from the same digital video (e.g., from the same camera viewfinder stream). The moving object removal system 102 accesses or processes the digital images 304a-304e sequentially or non-sequentially. Additionally, the moving object removal system 102 may access the digital images 304a-304e from the digital video at equal frame intervals (e.g., every frame for 5 frames, every 5' frame, every 20$^{th}$ frame), or may access the digital images randomly from the digital video.

Additionally, the moving object removal system 102 concatenates the digital images 304a-304e with a plurality of binary masks 306a-306e. For example, the moving object removal system 102 accesses and/or generates the binary masks 306a-306e that include regions of inverted pixels (e.g., white pixels) indicating a location of the undesired moving object (e.g., the person walking through the background) in corresponding digital images. To illustrate, the binary mask 306a includes a region of inverted pixels that have a shape and location that match the shape and location of the undesired moving object in the digital image 304a. In one or more embodiments, the moving object removal system 102 concatenates a binary mask to the corresponding images by generating a four channel input. In particular, the moving object removal system 102 combines the R, G, and B channels representing the image with a 1-dimensional binary mask channel.

As further shown in FIG. 3, the moving object removal system 102 utilizes the 3D to 2D generator 308 in connection with the temporal window 302 to generate the target digital image 310 corresponding to most recent digital image 304e in the temporal window 302. For example, the moving object removal system 102 utilizes the 3D to 2D generator 308 to encode the temporal window 302 into a feature space by generating a feature map for each of the digital images 304a-304e concatenated with a corresponding binary mask 306a-306e. The feature map for the most recent digital image 304e will have missing features corresponding to the location of the object being removed. The moving object removal system 102 utilizes the 3D to 2D generator 308 to minimize or deep-feature in-paint the missing regions in the feature map for most recent digital image 304e based on spatial-temporal features from the feature maps of the previous digital images 304a-304d. The moving object removal system 102 utilizes the 3D to 2D generator 308 to decode the resulting feature map into the target digital image 310. By utilizing the 3D to 2D generator 308 in this manner, the moving object removal system 102 generates the target digital image 310 such that an in-painted region previously associated with the undesired moving object maintains realistic visual features/content and textures when compared to the rest of the target digital image 310.

Figure 4:
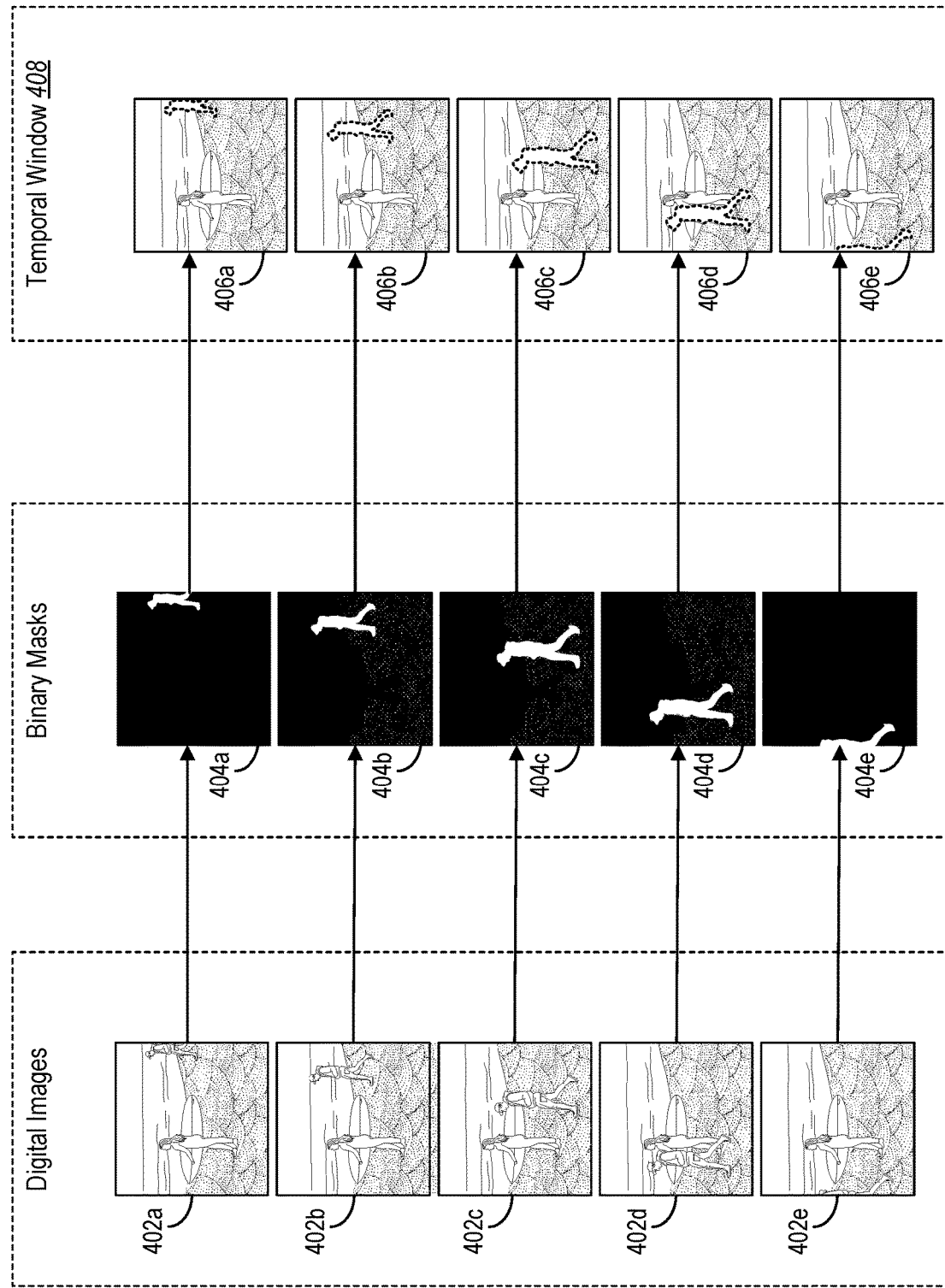
FIG. 4 illustrates the moving object removal system generating a temporal window of digital images concatenated with corresponding binary masks in accordance with one or more embodiments.

FIG. 4 illustrates the moving object removal system 102 generating corresponding binary masks for digital images (e.g., video frames) within a temporal window. For example, as will be discussed in greater detail below, the moving object removal system 102 accesses digital images 402a, 402b, 402c, 402d, and 402e from a digital video along with an indication of an undesired moving object (e.g., a user selection of the person walking past in front of the surfer) depicted in the digital images 402a-402e. The moving object removal system 102 further generates corresponding binary masks 404a, 404b, 404c, 404d, and 404e associated with the digital images 402a-402e and concatenates the digital images 402a-402e with the binary masks 404a-404e to generate for input into a 3D to 2D generator.

In more detail, the moving object removal system 102 accesses digital images (e.g., digital frames) from a digital video in response to a detected user interaction at the client device 108. For example, the moving object removal system 102 accesses digital images from a camera viewfinder stream of digital image frames in response to a detected user interaction with the camera viewfinder (e.g., with a camera viewfinder display on the client device 108). To illustrate, the moving object removal system 102 accesses a camera viewfinder stream associated with the camera 112 of the client device 108.

In response to a detected touch gesture (e.g., a tap touch gesture) with the camera viewfinder displayed on a display of the client device 108, the moving object removal system 102 accesses a predetermined or threshold number of previous digital images (e.g., video frames). For example, the moving object removal system 102 accesses a predetermined and/or static number of digital images (e.g., the five digital images 402a-402e). Specifically, the moving object removal system 102 can store in memory a predetermined number of previous video frames. Then in response to an initiation of an object removal process, the moving object removal system 102 can access the stored previous video frames. Additionally or alternatively, the moving object removal system 102 accesses a variable number of digital images. To illustrate, the moving object removal system 102 accesses a variable number of digital images that depends on a frame rate and/or resolution associated with a digital video from which the digital images are accessed or extracted. For example, the moving object removal system 102 may access a higher number of digital images from a digital video with a higher frame rate, and a lower number of digital images from a digital video with a lower frame rate, or vice versa.

In at least one embodiment, the moving object removal system 102 determines that the detected user interaction at the client device 108 also indicates an undesired moving object depicted in the digital images (e.g., the person walking in front of the surfer in the digital images 402a-402e). For example, in response to detecting the user interaction with the camera viewfinder displayed on the client device 108, the moving object removal system 102 determines a region of a digital image in the displayed camera viewfinder stream with which the detected user interaction (e.g., a tap touch gesture) comes in contact. In one or more embodiments, the moving object removal system 102 utilizes one or more computer vision techniques (e.g., an object detection model, an object tagger model) to determine an object indicated by the detected user interaction. For example, the indicated object includes a person or people, an animal or animals, or any other object that moves from one accessed digital image to the next.

In additional or alternative embodiments, the moving object removal system 102 automatically determines an undesired moving object depicted in the digital images. For example, in response to the detected user interaction at the client device 108, the moving object removal system 102 automatically determines an object that moves among the accessed digital images. To illustrate, the moving object removal system 102 utilizes an object detection model to detect one or more objects depicted in each of the accessed digital images. In at least one embodiment, the moving object removal system 102 further utilizes one or more object tracking techniques to determine one or more of the detected objects that move from one accessed digital image to the next.

Specifically, in one or more embodiments, the moving object removal system 102 utilizes a machine learning model to generate the binary masks 404a-404e. For example, in one or more embodiments, the moving object removal system 102 utilizes a video tracking system, such as that described in U.S. Pat. No. 10,319,412 and entitled "Robust Tracking of Objects in Videos," the entire contents of which are hereby incorporated by reference in their entirety, to localize the moving object and create the binary masks 404a-404e. In one or more alternative embodiments, the moving object removal system 102 utilizes a deep salient object segmentation system deployable on a client device, such as that described in U.S. Pat. No. 10,460,214 and entitled "Deep Salient Content Neural Networks for Efficient Digital Object Segmentation," the entire contents of which are hereby incorporated by reference in their entirety, to create the binary masks 404a-404e. In still further embodiments, the moving object removal system 102 utilizes a temporal object segmentation system, such as that described in U.S. Patent Application Publication No. 2020/0034971 and entitled "Image Object Segmentation Based on Temporal Information," the entire contents of which are hereby incorporated by reference in their entirety, to create the binary masks 404a-404e. In still further embodiments, the moving object removal system 102 utilizes a multimodal objection selection system, such as that described in U.S. Patent Application Publication No. 2019/0236394 and entitled "Utilizing Interactive Deep Learning to Select Objects in Digital Visual Media," the entire contents of which are hereby incorporated by reference in their entirety, to create the binary masks 404a-404e.

In at least one embodiment, the moving object removal system 102 determines that at least one of the detected moving objects is "undesired" based on a movement score and/or other considerations. For example, the moving object removal system 102 determines a movement score for each of the detected moving objects that reflects an amount of movement associated with the detected moving objects depicted among the accessed digital images. To illustrate, the moving object removal system 102 determines that both the surfer and the other person depicted in the digital images 402a-402e are associated with some movement. The moving object removal system 102 determines a low movement score for the surfer (e.g., to reflect the surfer's relative location changing a small amount from one digital image to the next due to camera movement). The moving object removal system 102 further determines a high movement score for the other person due to the relative location of the other person changing a large amount from one digital image to the next because the other person is actually walking through the depicted scene. Additionally or alternatively, the moving object removal system 102 further determines the movement score associated with an object based on changes to the shape or outline of the object (e.g., the outline of the person who is moving from one digital image to the next is likely to change, while the outline of a person who is standing still will remain the same or close to the same).

The moving object removal system 102 generates or otherwise determines corresponding binary masks 404a-404e associated with the digital images 402a-402e. For example, in one or more embodiments, the moving object removal system 102 determines the binary masks 404a-404e based on a location of the undesired moving object in each of the digital images 402a-402e. To illustrate, the moving object removal system 102 identifies the undesired moving object in each of the accessed digital images 402a-402e. For instance, in response to determining the undesired moving object (e.g., based on user selection or automatic detection), the moving object removal system 102 generates the binary masks 404a-404e by first determining a location (e.g., a region of pixels) associated with the undesired moving object in each of the accessed digital image 402a-402e. For example, the moving object removal system 102 determines the region of pixels associated with the undesired moving object by utilizing an object detection model to generate a heat map where pixels with a color value greater than a predetermined threshold are associated with the undesired moving object.

After determining a region of pixels associated with the undesired moving object in each of the digital images 402a-402e, the moving object removal system 102 generates a binary mask associated with each of the digital images 402a-402e. For example, the moving object removal system 102 generates the binary mask 404a associated with the digital image 402a by generating a monochromatic mask (e.g., a mask of black pixels) with a pixels length and width that are equal to those of the digital image 402a. The moving object removal system 102 then inverts the color (e.g., invert from black pixels to white pixels) of a region of pixels in the monochromatic mask that corresponds to the identified region of pixels in the digital image 402a associated with the undesired moving object. Thus, in at least one embodiment, as shown in FIG. 4, the resulting binary mask 404a includes black pixels and white pixels, where the region of white pixels in the binary mask 404a shares the shape and location of the undesired moving object detected in the digital image 402a. The moving object removal system 102 repeats this same process with the remaining accessed digital images 402b-402e to generate the corresponding binary masks 404b-404e.

In one or more embodiments, the moving object removal system 102 generates a temporal window 408 by generating concatenated digital images 406a, 406b, 406c, 406d, and 406e based on the digital images 402a-402e and the corresponding binary masks 404a-404e. For example, the moving object removal system 102 generates the concatenated digital image 406a by concatenating the R, B, and B channels of the digital images 402a-402e with a corresponding 1-dimensional binary mask. More specifically, the moving object removal system 102 concatenates the digital images 402a-402e and the corresponding binary masks 404a-404e along the channel dimension. The moving object removal system 102 then stacks the concatenations 406a-406e within the temporal window 408 along a new temporal dimension to generate a stacked tensor that serves as input to the 3D to 2D generator.

Figure 5:
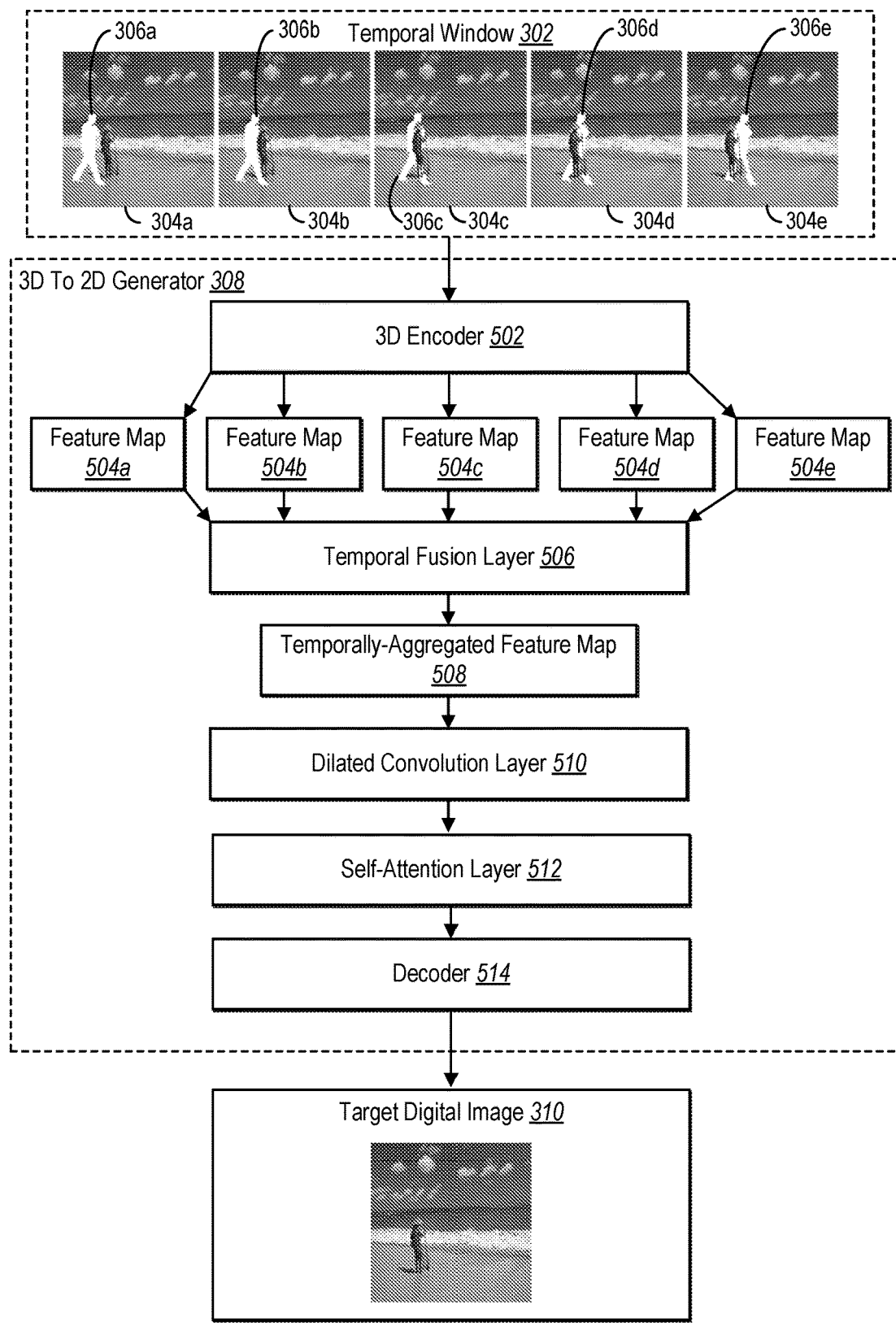
FIG. 5 illustrates the moving object removal system utilizing a 3D to 2D generator to generate a target digital image with an undesired moving object removed based on a temporal window of a sequence of digital images in accordance with one or more embodiments.

FIG. 5 illustrates the moving object removal system 102 utilizing the 3D to 2D generator 308 to generate the target digital image 310 with the undesired moving object (e.g., the person walking through the scene) removed based on the temporal window 302. For example, the moving object removal system 102 utilizes layers of gated convolutions across one or more of a three-dimensional (3D) encoder 502 and a temporal fusion layer 506 to generate a temporally-aggregated feature map 508 based on the temporal window 302. The moving object removal system 102 further modifies the temporally-aggregated feature map 508 with finer detail by increasing a receptive field of the 3D to 2D generator 308 utilizing a dilated convolution layer 510 followed by a self-attention layer 512. In at least one embodiment, the moving object removal system 102 further utilizes a decoder 514 to decode and up-sample the now-refined temporally-aggregated feature map 508 and generate the target digital image 310. The features and functionality of the 3D to 2D generator 308 will now be discussed in greater detail.

In one or more embodiments, the moving object removal system 102 utilizes the 3D encoder 502 to generate feature maps 504a, 504b, 504c, 504d, and 504e from each of the digital images 304a, 304b, 304c, 304d, and 304e, concatenated with corresponding binary masks 306a-306e. For example, as discussed above, the moving object removal system 102 concatenates the digital images 304a-304e with the binary masks 306a-306e along a channel dimension. The moving object removal system 102 further generates a tensor for input into the 3D encoder 502 by stacking the concatenated digital images (e.g., the digital images 304a-304e concatenated with the binary masks 306a-306e) along a temporal dimension. For example, the moving object removal system 102 stacks the concatenated images along the temporal dimension by layering the concatenated images into a single tensor and inputting the tensor into an input layer of the 3D encoder 502 that is adjusted to accommodate this stacking of concatenated digital images. For instance, the moving object removal system 102 adjusts an input layer of the 3D encoder 502 to accommodate a stack of five concatenated digital images—each with a channel dimension of 4 to account for red, green, and blue channels in addition to the binary mask channel.

In one or more embodiments, the moving object removal system 102 simultaneously down-samples and extracts spatial-temporal features from the stacked tensor of concatenated digital images utilizing an architecture of the 3D encoder 502 as described in Table 1 below:

TABLE 1

| Layer | Filters | Input Info | Output Info | Layer Info |
|---|---|---|---|---|
| 1 | 3DGConv, SN, ReLU | N*4*T*256*256 | N*32*T*256*256 | F32, K3*5*5, S1*1*1 |
| 2 | 3DGConv, SN, ReLU | N*32*T*256*256 | N*64*T*128*128 | F64, K3*4*4, S1*2*2 |
| 3 | 3DGConv, SN, ReLU | N*64*T*128*128 | N*64*T*128*128 | F64, K3*3*3, S1*1*1 |
| 4 | 3DGConv, SN, ReLU | N*64*T*128*128 | N*128*T*64*64 | F128, K3*4*4, S1*2*2 |
| 5 | 3DGConv, SN, ReLU | N*128*T*64*64 | N*128*T*64*64 | F128, K3*3*3, S1*1*1 |

Where: "3DGConv" is a 3-dimensional (3D) gated convolution, "SN" is a spectral normalization filter, "ReLU" is a rectified linear unit activation function, "N" represents a batch size, "T" represents the size of the temporal window 302, "F" represents the number of convolution filters, "K" represents kernel size (e.g., filter size), and "S" represents kernel stride.

For example, as mentioned above, the moving object removal system 102 utilizes the input layer (e.g., layer 1 from Table 1 above) of the 3D encoder 502 to receive the stacked tensor of concatenated digital images from the temporal window 302. Accordingly, as shown in Table 1 above, the first layer of the 3D encoder receives an input of 5 (e.g., "N" equals a batch size of 5 concatenated digital images), multiplied by 4 (e.g., the total channel dimension of each concatenated digital image that includes a red channel, a green channel, a blue channel, and a binary mask channel), multiplied by an amount of time that elapsed from the earliest digital image in the temporal window 302 to the latest digital image in the temporal window 302, multiplied by 256 (e.g., the pixel width of each of the digital images 304a-304e), multiplied by 256 (e.g., the pixel length of each of the digital images 304a-304e). Accordingly, as shown in Table 1, the layers of the 3D encoder 502 gradually increase the feature dimension of the layer outputs (e.g., from 32 to 128) while simultaneously down-sampling the images from 256×256 to 64×64.

As further shown in Table 1, the moving object removal system 102 performs this down-sampling and spatial temporal feature extraction utilizing layers of 3D gated convolutions, spectral normalization filters, and rectified linear unit activation functions. For example, the moving object removal system 102 utilizes gated convolutions to increase the efficiency of one or more layers of the 3D to 2D generator 308. In more detail, a typical convolution (e.g., "vanilla" convolutions) includes a number of neurons or filters that receive input from a restricted subarea (e.g., a receptive field) of a previous layer. For all spatial locations in an input volume, a "vanilla" convolution applies the same filters to produce an output volume. As such, "vanilla" convolutions are well-suited for tasks such as image classification and object detection, where all pixels of an input image are valid. "Vanilla" convolutions, however, are not suitable for tasks such as image in-painting where an input image is composed of both regions of valid pixels and regions of invalid pixels (e.g., such as in masked regions).

Accordingly, the moving object removal system 102 utilizes gated convolutions within the layers of the 3D to 2D generator 308 that learn to focus on valid pixels in order to extract features that are applicable to the regions of invalid pixels. For example, moving object removal system 102 formulates a gated convolution as follows:

$$\text{Gating}_{y,x} = \Sigma\Sigma W_g \cdot I$$

$$\text{Feature}_{y,x} = \Sigma\Sigma W_f \cdot I$$

$$O_{y,x} = \phi(\text{Feature}_{y,x}) \odot \sigma(\text{Gating}_{y,x})$$

Where $\sigma$ is a sigmoid function thus the output gating values are between zeros and ones, $\phi$ can be any activation function (e.g., ReLU, ELU, Leaky ReLU), and $W_g$ and $W_f$ are two different convolutional filters. The resulting gated convolution learns a dynamic feature selection mechanism for each channel and each spatial location from the input volume. As shown in the Table 1, the moving object removal system 102 utilizes 3D gated convolutions through the five layers of the 3D encoder 502 to account for the time variable (e.g., "T") in the stacked input tensor. Another example of gated convolutions in a convolutional neural network is found in Yu, J., Lin, Z., Yang, J., Shen, X., Lu, X., & Huang, T., *Free-Form Image Inpainting With Gated Convolution*, ICCV, 2019, the entire contents of which is hereby incorporated by reference.

In one or more embodiments, the moving object removal system 102 utilizes one or more spectral normalization ("SN") filters in the various layers of the 3D to 2D generator 308 to address potential model collapse and learning instabilities. For example, as shown in Table 1, the moving object removal system 102 utilizes spectral normalization by applying a weight normalization to each of the five layers of the 3D encoder 502 in order to stabilize learning of these layers. In at least one embodiment, the spectral normalization filters in each of the five layers of the 3D encoder 502 control the Lipschitz constant associated with the 3D encoder 502, thereby mitigating problems associated with gradient and mode collapse (e.g., problems typically observed during backpropagation during learning).

As further shown in Table 1, the moving object removal system 102 utilizes a rectified linear unit activation function ("ReLU") in each of the five layers of the 3D encoder 502. In one or more embodiments, ReLU and other activation functions decide whether a neuron or filter of a neural network should be activated or not. In one embodiment, an activation function is a non-linear transformation applied to an input volume prior to providing that input volume to a next layer of neurons or filters, or prior to finalizing that volume as an output. In at least one embodiment, the ReLU activation function is defined as: f(x)=max(0, x). As such, the ReLU activation function does not activate all neurons in a next layer of the 3D encoder 502 at the same time because if an input value is negative, ReLU converts that value to zero and a next neuron is not activated.

Returning to FIG. 5, the moving object removal system 102 utilizes the 3D encoder 502 (e.g., as in the architecture laid out in Table 1 above) to generate the feature maps 504a, 504b, 504c, 504d, and 504e corresponding to the concatenated images in the temporal window 302. For example, the five layers of the 3D encoder 502 extracts and downsamples spatial-temporal features from each of the concatenated digital images represented in the stacked tensor and represents these spatial-temporal features in the feature maps 504a-504e. Because each of the five layers of the 3D encoder 502 includes a 3D gated convolution, as discussed above, the 3D encoder 502 extracts valid information from non-missing regions of the concatenated images.

The 3D encoder 502 also fills-in (e.g., in-paints) at least a percentage or portion of the missing regions represented among the spatial-temporal features represented in the feature maps 504a-504e based on valid information from neighboring concatenated digital images represented in the stacked input tensor. To further in-paint missing regions represented among the spatial-temporal features represented in the feature maps 504a-504e, the moving object removal system 102 utilizes the temporal fusion layer 506 to generate the temporally-aggregated feature map 508 based on the feature maps 504a-504e. In one or more embodiments, the temporal fusion layer 506 "borrows," or otherwise replicates valuable information (e.g., deep features) from non-missing regions from neighboring images for the purpose of synthesizing missing regions represented in the feature maps 504a-504e at the feature level. For example, the moving object removal system 102 utilizes an architecture of the temporal fusion layer 506 as described in Table 2 below:

TABLE 2

| Layer | Filters | Input Info | Output Info | Layer Info |
|---|---|---|---|---|
| 1 | 3DGConv, SN, ReLU | N*128*T*64*64 | N*128*1*64*64 | F128, KT*1*1, S1*1*1 |

As shown, the temporal fusion layer 506 fuses the feature maps 504a-504e along the temporal dimension utilizing a 3D gated convolution followed by a spectral normalization filter and a ReLU activation function in order to generate the temporally-aggregated feature map 508. For example, in generating the temporally-aggregated feature map 508, the temporal fusion layer 506 utilizes spatial-temporal features from the feature maps 504b-504e to fill in one or more missing regions from the feature map 504a represented in the temporally-aggregated feature map 508. In at least one embodiment, the temporal fusion layer 506 repeats this process utilizing all of the spatial-temporal features from the feature maps 504b-504e until missing regions represented in the temporally-aggregated feature map 508 are reduced or filled in.

In one or more embodiments, the moving object removal system 102 further refines the temporally-aggregated feature map 508 utilizing additional layers of the 3D to 2D generator 308. In at least one embodiment, some or all of the additional layers of the 3D to 2D generator 308 function in connection with the entire volume of the temporally-aggregated feature map 508 (e.g., the additional layers cover the whole representative image). Accordingly, prior to utilizing these additional layers, the moving object removal system 102 increases the receptive field (e.g., the global view) of the 3D to 2D generator 308 by utilizing the dilated convolution layer 510 to process the temporally-aggregated feature map 508.

For example, the moving object removal system 102 utilizes an architecture of the dilated convolution layer 510 as described in Table 3 below to expand the effective receptive field to 61×61:

TABLE 3

| Layer | Filters | Input Info | Output Info | Layer Info |
|---|---|---|---|---|
| 1 | 2DGConv, SN, ReLU | N*128*64*64 | N*128*64*64 | F128, K3*3, S1*1, D2 |
| 2 | 2DGConv, SN, ReLU | N*128*64*64 | N*128*64*64 | F128, K3*3, S1*1, D4 |
| 3 | 2DGConv, SN, ReLU | N*128*64*64 | N*128*64*64 | F128, K3*3, S1*1, D8 |
| 4 | 2DGConv, SN, ReLU | N*128*64*64 | N*128*64*64 | F128, K3*3, S1*1, D16 |
| 5 | 2DGConv, SN, ReLU | N*128*64*64 | N*128*64*64 | F128, K3*3, S1*1, D1 |
| 6 | 2DGConv, SN, ReLU | N*128*64*64 | N*128*64*64 | F128, K3*3, S1*1, D1 |

Where "2DGConv" is a 2-dimensional (2D) gated convolution, "D" is a dilation factor that iteratively enlarges the receptive field of the 3D to 2D generator 308. As further shown in Table 3, because the temporal dimension is fused down to 1 in the previous temporal fusion layer 506, the six layers of the dilated convolution layer 510 include 2-dimensional kernels ("K") and strides ("S"), while the previous 3-dimensional 3D encoder 502 and temporal fusion layer 506 included layers with 3-dimensional kernels and strides.

With the receptive field of the 3D to 2D generator 308 enlarged to the size of the temporally-aggregated feature map 508 by the six layers of the dilated convolution layer 510, the moving object removal system 102 further refines the temporally-aggregated feature map 508 utilizing the self-attention layer 512. For example, the moving object removal system 102 utilizes an architecture of the self-attention layer 512 that includes input info: N*128*64*64, and output info: N*128*64*64.

In one or more embodiments, the self-attention layer 512 leverages complementary spatial-temporal features in the temporally-aggregated feature map 508, even when those features are located across distant portions of the temporally-aggregated feature map 508. For example, the self-attention layer 512 divides the temporally-aggregated feature map 508 into regions and coordinate features from a first region with features from one or more additional regions in the temporally-aggregated feature map 508. The self-attention layer 512 repeats this process with every region in the temporally-aggregated feature map 508 until the temporally-aggregated feature map 508 includes fine details coordinated across all the determined regions. In some embodiments, the moving object removal system 102 utilizes the self-attention techniques and approaches described in Zhang, H., Goodfellow, I., Metaxas, D. & Odena, A., *Self-Attention Generative Adversarial neural networks*, PMLR, 2019, the entirety of which is incorporated herein by reference.

As shown in FIG. 5, the moving object removal system 102 utilizes decoder 514 in connection with the temporally-aggregated feature map 508 to generate the target digital image 310. For example, the moving object removal system 102 utilizes an architecture of the decoder 514 as described in Table 4 below:

TABLE 4

| Layer | Filters | Input Info | Output Info | Layer Info |
|---|---|---|---|---|
| 1 | Upsample + 2DGConv, SN, ReLU | N*128*64*64 | N*64*128*128 | F64, K3*3, S1*1 |
| 2 | 2DGConv, SN, ReLU | N*64*128*128 | N*64*128*128 | F64, K3*3, S1*1 |
| 3 | Upsample + 2DGConv, SN, ReLU | N*64*128*128 | N*32*256*256 | F128, K3*3, S1*1 |
| 4 | 2DGConv, SN, ReLU | N*32*256*256 | N*16*256*256 | F16, K3*3, S1*1 |
| 5 | 2DGConv, SN, ReLU | N*16*256*256 | N*3*256*256 | F3, K3*3, S1*1 |

As shown, the decoder 514 includes five layers of 2-dimensional gated convolutions and two up-sampling functions. In one or more embodiments, the five layers of 2D gated convolutions decode the temporally-aggregated feature map 508 back into an RGB digital image. Simultaneously, the up-sampling functions (e.g., bi-linear up-sampling) expand the decoded image from 64×64 pixels up to the original 256×256. For example, as shown in the output info of the fifth layer of the decoder 514, the output of the decoder 514 (and the 3D to 2D generator 308) is a digital image with a height of 3 (representing the red, green, and blue dimensions), a length of 256 pixels, and a width of 256 pixels-which is a standard representation of an RGB digital image.

In one or more embodiments, the output of the last layer of the decoder 514 is the target digital image 310. For example, as shown in FIG. 5, the 3D to 2D generator 308 generates the target digital image 310 including at least one of the input digital images 304a-304e with the missing region of pixels associated with the corresponding binary mask in-painted. In at least one embodiment, the 3D to 2D generator 308 in-paints the missing region with photo-realistic textures and curves—effectively erasing the undesired moving object previously present in the digital image—by decoding the temporally-aggregated feature map 508 as revised by the dilated convolution layer 510 and the self-attention layer 512.

In one or more embodiments, the acts and algorithms described in relation to FIG. 5 comprise the corresponding structure for performing a step for generating, based on the sequence of digital images concatenated with the plurality of binary masks, a target digital image with the undesired object removed.

Figure 6:
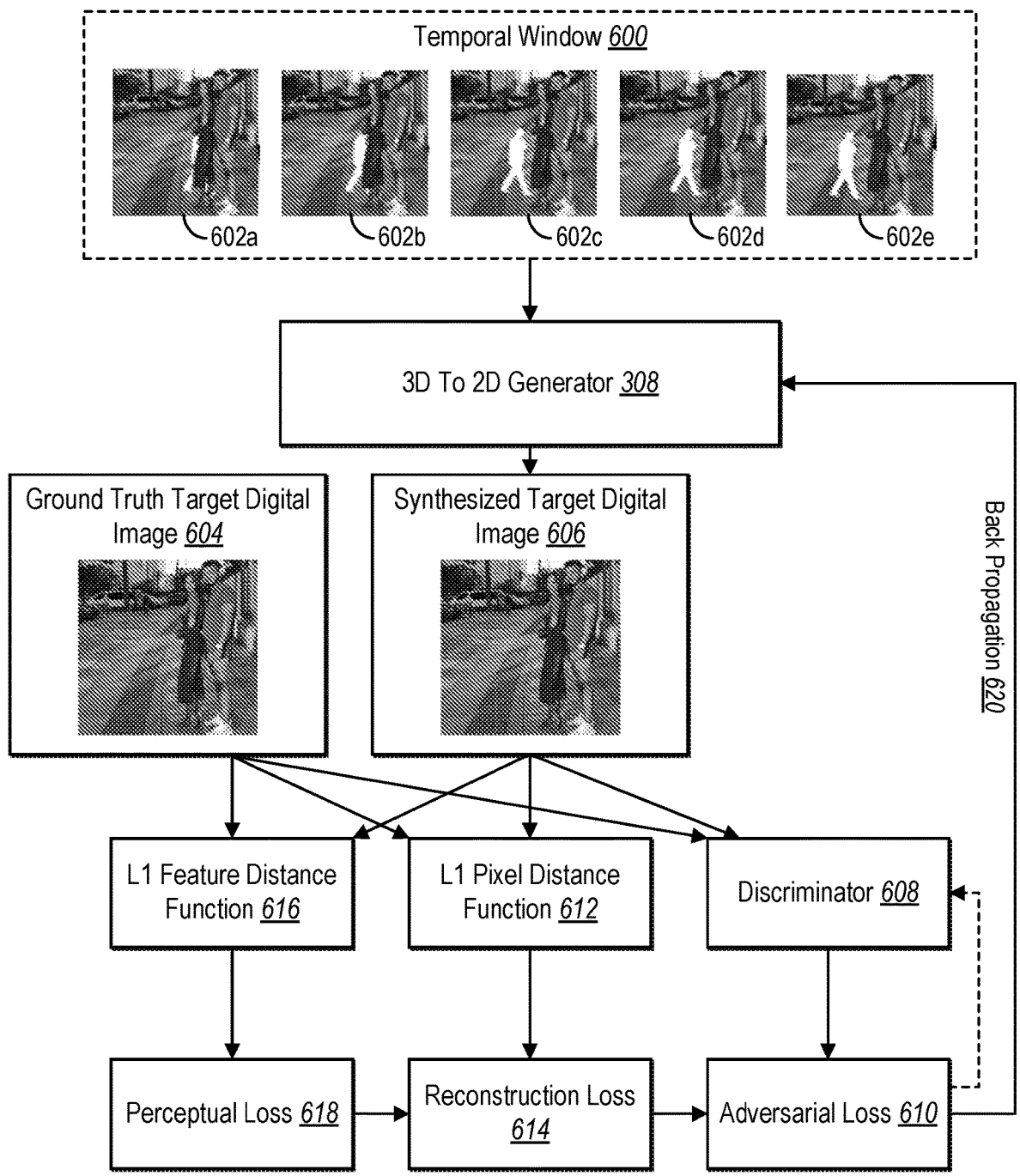
FIG. 6 illustrates the moving object removal system learning parameters of a 3D to 2D generator in accordance with one or more embodiments.

FIG. 6 illustrates the moving object removal system 102 learning parameters of the 3D to 2D generator 308. For example, and as will be discussed in greater detail below, the moving object removal system 102 learns parameters of the 3D to 2D generator 308 utilizing adversarial deep learning. In each learning epoch, the moving object removal system 102 determines one or more of an adversarial loss, a reconstruction loss, and a perceptual loss. The moving object removal system 102 backpropagates one or more of the determined losses to learn parameters of the 3D to 2D generator 308.

In more detail, the moving object removal system 102 generates a temporal window 600 of learning digital images 602a, 602b, 602c, 602d, 602e and a corresponding ground truth digital image 604. For example, in one or more embodiments, the moving object removal system 102 generates the learning digital images 602a-602e by generating five copies of a digital image (e.g., an RBG digital image). In at least one embodiment, the moving object removal system 102 simulates the binary mask concatenation discussed above by cropping a random shape out of each of the five copies of the digital image at a random location in each digital image (e.g., leaving at least one region of missing pixels in each digital image). The resulting learning digital images 602a-602e, for example, simulate a series of digital video frames concatenated with binary masks indicating an undesired moving object in each digital video frame. The moving object removal system 102 also generates the ground truth target digital image by generating a sixth copy of the digital image with no additional cropping. In one or more embodiments, the moving object removal system 102 repeats this process to generate a full learning set of learning digital images and corresponding ground truth digital images.

As shown in FIG. 6, the moving object removal system 102 utilizes multiple learning approaches to learn parameters of the 3D to 2D generator 308. For example, the moving object removal system 102 utilizes: a discriminator 608 to determine an adversarial loss 610, an L1 pixel distance function 612 to determine a reconstruction loss 614, and an L1 feature distance function 616 to determine a perceptual loss 618. The moving object removal system 102 then backpropagates one or more of the losses 610, 614, 618 in order to learn parameters of the 3D to 2D generator 308.

In one or more embodiments, the moving object removal system 102 generates the adversarial loss 610 by utilizing the 3D to 2D generator 308 to generate a synthesized target digital image. For example, the moving object removal system 102 utilizes the 3D to 2D generator 308 to generate the synthesized target digital image 606 based on the temporal window 600 of learning digital images 602a-602e, as discussed above. In at least one embodiment, the moving object removal system 102 further utilizes the discriminator 608 to generate a predicted classification associated with one or more of the synthesized target digital image 606 and the ground truth target digital image 604. Based on whether the predicted classification is correct (e.g., predicted positive samples for ground truth target digital images and predicted negative samples for synthesized target digital images), the moving object removal system 102 further generates the adversarial loss 610. The moving object removal system 102 utilizes the adversarial loss 610 to learn parameters of both the 3D to 2D generator 308 and to learn parameters of the discriminator 608.

In one or more embodiments, the discriminator 608 is a spectral-normalization discriminator (SNGAN) that maintains the Lipschitz-Continuity. The discriminator 608, for example, generates predicted classifications associated with an input image (e.g., either the ground truth target image 604 or the synthesized target digital image 606) by determining whether highly detailed features in distant portions of the image are consistent with each other. Put another way, the discriminator 608 enforces complicated geometric constraints on a global image structure as a way of determining whether the input image is "real" (e.g., the ground truth target image 604) or "fake" (e.g., the synthesized target digital image 606). Over multiple learning epochs, the moving object removal system 102 utilizes the adversarial loss 610 to both improve the predictive ability of the discriminator 608 (e.g., make the discriminator 608 harder to "fool"), as well as improve the capacity of the 3D to 2D generator 308 to generate target digital images with regions of photo-realistic in-painting.

In at least one embodiment, the moving object removal system 102 learns parameters of both the 3D to 2D generator 308 and the discriminator 608 in an alternating fashion in order to utilize computing resources more efficiently. For example, the moving object removal system 102 alternatingly learns parameters of the 3D to 2D generator 308 and the discriminator 608 by minimizing a hinge version of the adversarial loss 610. To illustrate, the moving object removal system 102 learns parameters of the 3D to 2D generator 308 by maximizing the adversarial loss 610. Conversely, the moving object removal system 102 learns parameters of the discriminator 608 by minimizing the adversarial loss 610. In one or more embodiments, the moving object removal system 102 implements the hinge version of the adversarial loss 610 according to the following equations:

$$L_D = -\mathbb{E}_{(x,y) \sim P_{data}}[\min(0, -1 + D(x,y))] - \mathbb{E}_{(x,y) \sim P_{data}}[\min(0, -1 + D(x,y))]$$

$$L_G = -\mathbb{E}_{z \sim P_z, y \sim P_{data}} D(G(z), y)$$

Where G is the generator, D is the discriminator, x is the set of input images (e.g., the learning input images 602a-602e), y is the target digital image (e.g., the ground truth target digital image 604), and z is the latent vector (e.g., the temporally-aggregated feature map 508) from which the target digital image is generated. The moving object removal system 102 calculates $L_D$ as the adversarial loss 610 for the discriminator 608, and the moving object removal system 102 calculates $L_G$ as the adversarial loss 610 for the 3D to 2D generator 308. In some embodiments, the moving object removal system 102 utilizes the adversarial loss techniques and approaches found in Zhang, H., Goodfellow, I., Metaxas, D. & Odena, A., *Self-Attention Generative Adversarial neural networks*, PMLR, 2019, the entirety of which is incorporated herein by reference.

As further shown in FIG. 6, the moving object removal system 102 generates the reconstruction loss 614 utilizing a synthesized target digital image 606 generated by the 3D to 2D generator 308 and a ground truth target digital image 604 in connection with the L1 pixel distance function 612. For example, the L1 pixel distance function 612 is a modified L1 distance approach that determines pixel loss between the ground truth target digital image 604 and the synthesized target digital image 606. In one or more embodiments, the moving object removal system 102 utilizes the L1 pixel distance function 612 to determine the reconstruction loss 614 representing pixel loss of missing regions in-painted in the synthesized target digital image 606, where valid regions are normalized with their respective area size. For instance, the moving object removal system 102 utilizes the L1 pixel distance function as follows:

$$L_{l1}(G(x), y) = \frac{\sum (\|y - G(x)\| \otimes M)}{A_{hole}} + \frac{\sum (\|y - G(x)\| \otimes (1 - M))}{A_{valid}}$$

Where x is the temporal window 600 or input images 602a-602e with corresponding binary masks, G (x) is the output of the 3D to 2D generator (e.g., synthesized truth target digital image 606), y is a ground truth target digital image 604, M is the binary mask, $A_{hole}$ represents a region of missing pixels normalized with its respective area size, and $A_{valid}$ represents a region of valid pixels normalized with its respective area size.

As further shown in FIG. 6, the moving object removal system 102 generates the perceptual loss 618 utilizing a synthesized target digital image 606 generated by the 3D to 2D generator 308 and a ground truth target digital image 604 in connection with the L1 feature distance function 616. In one or more embodiments, the moving object removal system 102 utilizes the L1 feature distance function 616 to determine distance loss between the synthesized target digital image 606 and the ground truth target digital image 604 on a feature level. For example, the moving object removal system 102 utilizes a pretrained convolutional neural network (e.g., a VGG-16 neural network) to generate $2^{nd}$, $4^{th}$, $7^{th}$, and $10^{th}$ ReLU activated feature maps for both the synthesized target digital image 606 and the ground truth target digital image 604. The moving object removal system 102 utilizes a L1 feature distance function 616 to determine L1 distances as a feature-level loss between corresponding feature maps between the synthesized target digital image 606 and the ground truth target digital image 604. Another example of perceptual loss-based learning is found in Johnson, J., Alahi, A., and Fei-Fei, L., *Perceptual Losses for Real-Time Style Transfer and Super-Resolution*, ECCV, 2016, the entire contents of which is hereby incorporated by reference.

As mentioned above, the moving object removal system 102 learns parameters of the 3D to 2D generator 308 based on one or more of the adversarial loss 610, the reconstruction loss 614, and the perceptual loss 618. For example, the moving object removal system 102 performs the act 620 of backpropagating one or more of the losses 610, 614, and 618 to learn the parameters of the 3D to 2D generator 308. In at least one embodiment, and in every learning epoch, the moving object removal system 102 generates a combination of the losses 610, 614, and 618, and perform the act 620 of backpropagating based on the generated combination. In one or more embodiments, the moving object removal system 102 performs multiple learning epochs (e.g., utilizing the discriminator 608, the L1 pixel distance function 612, and the L1 feature distance function 616) until one or more of the losses 610, 614, and 618 converge (e.g., remains stable over a threshold number of epochs).

Figure 7:
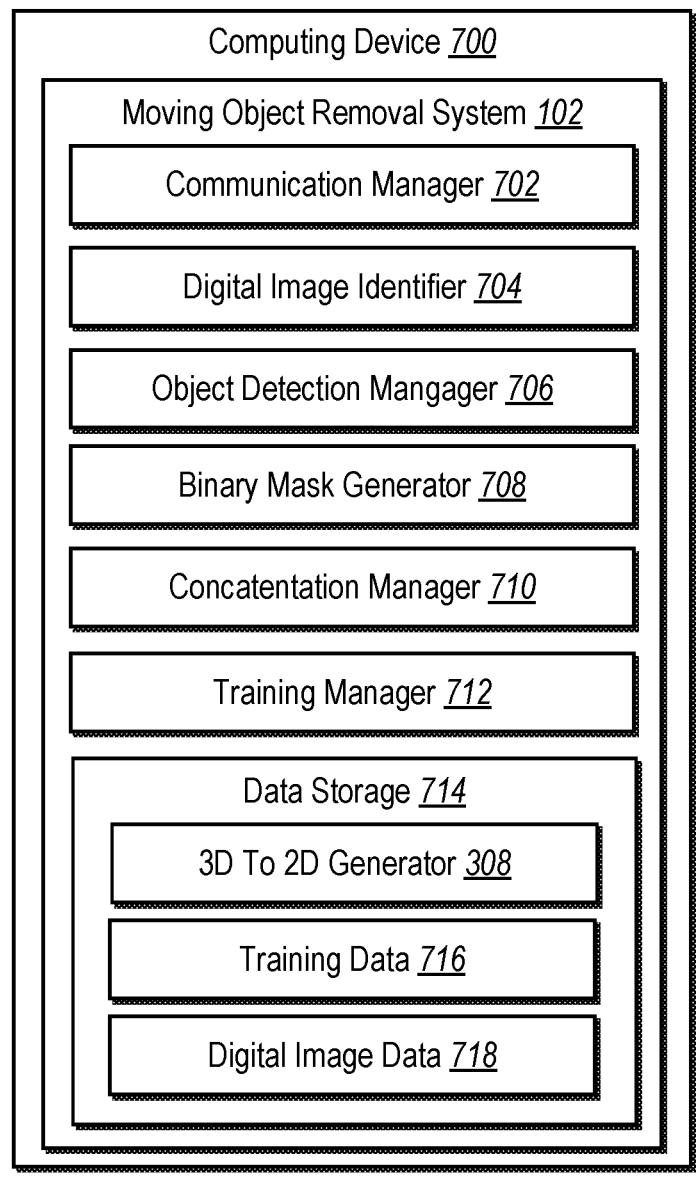
FIG. 7 illustrates a schematic diagram of the moving object removal system in accordance with one or more embodiments.

FIG. 7 illustrates a detailed schematic diagram of an embodiment of the moving object removal system 102 operating on a computing device 700 in accordance with one or more embodiments. As discussed above, the moving object removal system 102 is operable on a variety of computing devices. Thus, for example, the computing device 700 is optionally the server(s) 106 and/or the client device 108. In one or more embodiments, the moving object removal system 102 includes a communication manager 702, a digital image identifier 704, an object detection manager 706, a binary mask generator 708, a concatenation manager 710, a learning manager 712, and a data storage 714 including the 3D to 2D generator 308, learning data 716, and digital image data 718.

As mentioned above, and as shown in FIG. 7, the moving object removal system 102 includes the communication manager 702. In one or more embodiments, the communication manager 702 receives and transmits data. For example, the communication manager 702 receives a camera viewfinder stream of digital image frames from a camera viewfinder of the camera 112. Additionally, the communication manager 702 transmits a target digital image (e.g., generated by the 3D to 2D generator 308) to a display (e.g., a camera viewfinder display) of the client device 108. In at least one embodiment, the communication manager 702 also receives information associated with detected user interactions in connection with the camera viewfinder display of the client device 108. For example, the communication manager 702 receives information indicating a type of user interaction, and a location of the user interaction relative to the camera viewfinder display.

As mentioned above, and as shown in FIG. 7, the moving object removal system 102 includes the digital image identifier 704. In one or more embodiments, the digital image identifier 704 accesses a threshold number of digital images from the received camera viewfinder stream in response to a detected user interaction. For example, the digital image identifier 704 accesses five digital images from the received camera viewfinder stream in response to a detected tap touch gesture with the camera viewfinder display. In at least one embodiment, the digital image identifier 704 accesses five sequential digital images from the received camera viewfinder stream. In alternatively embodiments, the digital image identifier 704 access five non-sequential digital images from the received camera viewfinder stream.

As mentioned above, and as shown in FIG. 7, the moving object removal system 102 includes the object detection manager 706. In one or more embodiments, the object detection manager 706 detects an undesired moving object in each of the accessed digital images. For example, the object detection manager 706 can determine an object in a first accessed digital image that corresponds to the detected user interaction. More specifically, in at least one embodiment, the object detection manager 706 utilizes an object detection model, such as those described above in reference to FIG. 4, to determine a region of pixels corresponding with an object at a location indicated by the detected user interaction in the connection with the first accessed digital image. The object detection manager 706 then utilizes the object detection model to determine regions of pixels corresponding with the same object in the remaining accessed digital images.

In an additional or alternative embodiment, the object detection manager 706 automatically detects the undesired moving object in the accessed digital images. For example, in at least one embodiment, the object detection manager 706 utilizes the object detection model to determine all objects depicted in the accessed digital images along with their relative locations. The object detection manager 706 then identifies one or more objects that move among the accessed digital images (e.g., as with a photo bomber moving into the background of a posed scene) as undesired moving objects.

As mentioned above, and as shown in FIG. 7, the moving object removal system 102 includes the binary mask generator 708. In one or more embodiments, the binary mask generator 708 generates binary masks associated with each of the accessed digital images based on regions of pixels corresponding to the undesired moving object in each of the accessed digital images. For example, the binary mask generator 708 generates a monochromatic binary mask (e.g., of black pixels) for a first accessed digital image with dimensions (e.g., length and width) equal to those of the digital image. The binary mask generator 708 then inverts a region of black pixels in the binary mask to white pixels, where the region of inverted pixels in the binary mask corresponds to the region of pixels associated with the undesired moving object detected in the digital image. The binary mask generator 708 similarly generates a binary mask for every other accessed digital image.

As mentioned above, and as shown in FIG. 7, the moving object removal system 102 includes the concatenation manager 710. In one or more embodiments, the concatenation manager 710 concatenates the generated binary masks with their corresponding digital images. For example, the concatenation manager 710 concatenates a binary mask with a corresponding digital image along a channel dimension (e.g., so that corresponding pixels line up). In at least one embodiment, the concatenation manager 710 concatenates the inverted pixels of the binary mask with the corresponding digital image along the channel dimension and disregards other un-inverted pixels in the binary mask. In at least one embodiment, the resulting concatenated digital image includes valid regions of original pixels from the accessed digital image and at least one missing region of pixels corresponding to the undesired moving object.

As mentioned above, and as shown in FIG. 7, the moving object removal system 102 includes the training manager 712. In one or more embodiments, the training manager 712 trains and periodically re-trains the 3D to 2D generator 308. For example, as discussed above, the training manager 712 trains the 3D to 2D generator 308 to aggregate temporal information and synthesize realistic texture patches in an in-painted region of a target digital image. The training manager 712 adversarially trains the 3D to 2D generator 308 based on an adversarial loss. Additionally, in one or more embodiments, the training manager 712 trains the 3D to 2D generator 308 based on a reconstruction loss and/or a perceptual loss.

As mentioned above, and as shown in FIG. 7, the moving object removal system 102 includes the data storage 714. In one or more embodiments, the data storage 714 includes the 3D to 2D generator 308. Additionally, in one or more embodiments, the data storage 714 includes training data 716. For example, the training data 716 includes training digital images and corresponding ground truth target digital images. Moreover, in one or more embodiments, the data storage 714 includes digital image data 718. For example, digital image data 718 includes digital image information such as described herein, including but not limited to, digital images, and modified versions of digital image with in-painted regions of pixels.

Each of the components 702-718 and 308 of the moving object removal system 102 includes software, hardware, or both. For example, the components 702-718 and 308 includes one or more instructions stored on a computer-readable storage medium and executable by processors of one or more computing devices, such as a client device or server device. When executed by the one or more processors, the computer-executable instructions of the moving object removal system 102 can cause the computing device(s) to perform the methods described herein. Alternatively, the components 702-718 and 308 includes hardware, such as a special-purpose processing device to perform a certain function or group of functions. Alternatively, the components 702-718 and 308 of the moving object removal system 102 includes a combination of computer-executable instructions and hardware.

Furthermore, the components 702-718 and 308 of the moving object removal system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-718 and 308 may be implemented as a stand-alone application, such as a desktop or mobile application. Furthermore, the components 702-718 and 308 may be implemented as one or more web-based applications hosted on a remote server. The components 702-718 and 308 may also be implemented in a suite of mobile device applications or "apps." To illustrate, the components 702-718 and 308 may be implemented in an application, including but not limited to ADOBE CREATIVE CLOUD, such as ADOBE PHOTOSHOP or ADOBE PHOTOSHOP CAMERA. "ADOBE", "CREATIVE CLOUD", "PHOTOSHOP", and "PHOTOSHOP CAMERA" are either registered trademarks or trademarks of Adobe Systems Incorporated in the United States and/or other countries.

Figure 8:
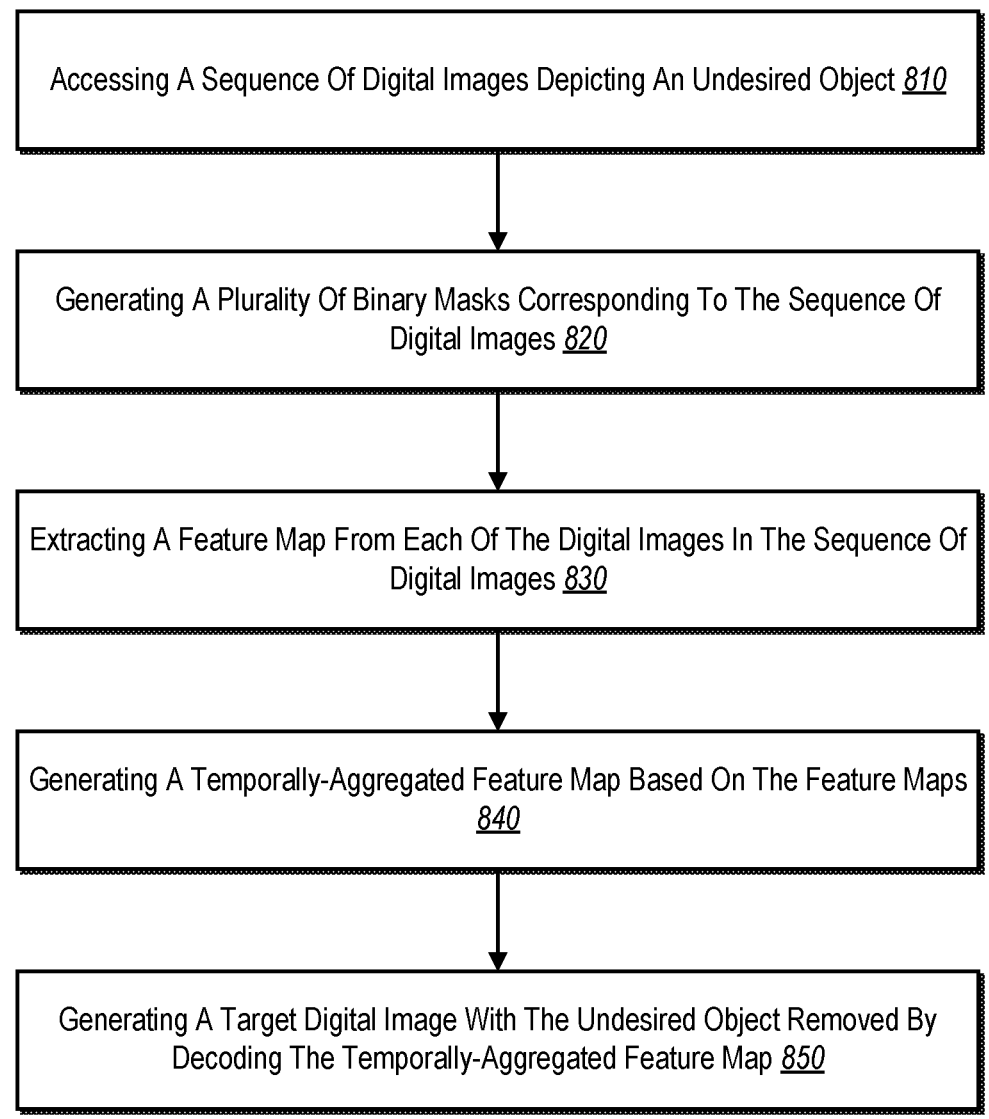
FIG. 8 illustrates a flowchart of a series of acts for generating a target digital image by removing an undesired object in accordance with one or more embodiments.
Figure 9:
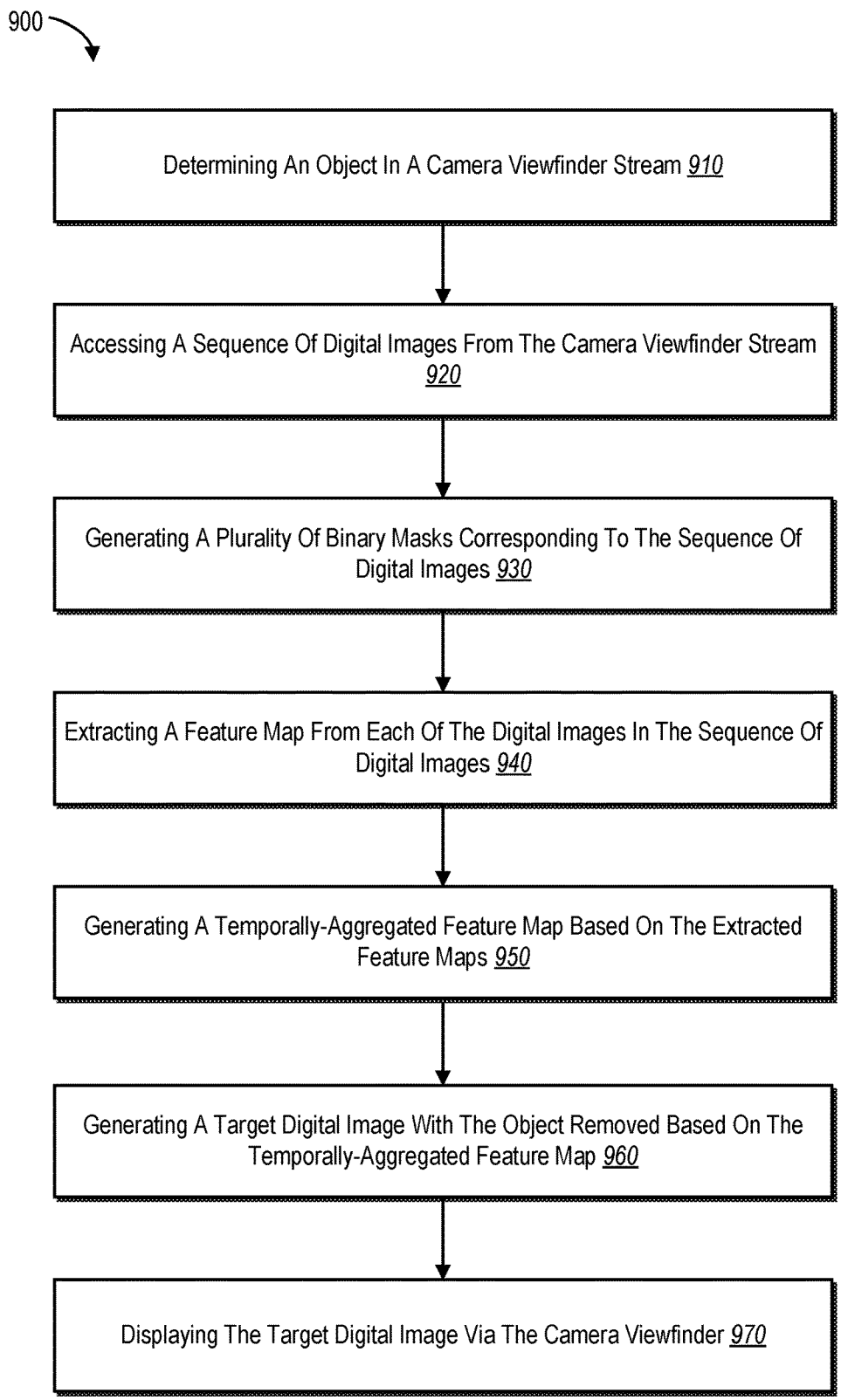
FIG. 9 illustrates a flowchart of a series of acts for generating a target digital image based on digital images accessed from a camera viewfinder stream in accordance with one or more embodiments.

FIGS. 1-7, the corresponding text, and the examples provide a number of different methods, systems, devices, and non-transitory computer-readable media of the moving object removal system 102. In addition to the foregoing, one or more embodiments can also be described in terms of flowcharts comprising acts for accomplishing a particular result, as shown in FIGS. 8 and 9. FIGS. 8 and 9 may be performed with more or fewer acts. Further, the acts may be performed in differing orders. Additionally, the acts described herein may be repeated or performed in parallel with one another or parallel with different instances of the same or similar acts.

As mentioned, FIG. 8 illustrates a flowchart of a series of acts 800 for generating a target digital image with at least one region of pixels in-painted thereby removing an undesired object in accordance with one or more embodiments. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of accessing a sequence of digital images depicting an undesired object. For example, the act 810 involves accessing a sequence of digital images within a temporal window, wherein one or more of the digital images in the sequence of digital images depicts an undesired object.

As shown in FIG. 8, the series of acts 800 includes an act 820 of generating a plurality of binary masks corresponding to the sequence of digital images. For example, the act 820 involves generating a plurality of binary masks corresponding to the sequence of digital images, wherein the binary masks indicate a location of the undesired object in corresponding digital images from the sequence of digital images.

As shown in FIG. 8, the series of acts 800 includes an act 830 of extracting a feature map from each of the digital images in the sequence of digital images. For example, the act 830 involves extracting, utilizing a three-dimensional (3D) encoder of a 3D to two-dimensional (2D) generator, a feature map from each of the digital images in the sequence of digital images. In one or more embodiments, the series of acts 800 further include acts of: concatenating each of the digital images in the sequence of digital images with a corresponding binary mask from the plurality of binary masks; and extracting the feature map from each of the digital images in the sequence of digital images by extracting the feature map from each of the digital images concatenated with the corresponding binary mask.

For example, in at least one embodiment, extracting, utilizing the 3D encoder of the 3D to 2D generator, the feature map from each of the digital images in the sequence of digital images includes: generating a stacked tensor based on the digital images concatenated with a corresponding binary mask indicating the location of the undesired object; and down-sampling the stacked tensor utilizing a plurality of gated convolutions while extracting spatial-temporal features from the stacked tensor into feature maps corresponding to the digital images in the sequence of digital images. In one or more embodiments, extracting the spatial-temporal features from the stacked tensor into feature maps includes, for each digital image concatenated with a corresponding binary mask indicating the location of the undesired object in the digital image, extracting spatial-temporal features across the sequence of digital images that fill-in an area of the binary mask in the digital image.

As shown in FIG. 8, the series of acts 800 includes an act 840 of generating a temporally-aggregated feature map based on the feature maps. For example, the act 840 involves generating, utilizing a temporal fusion layer of the 3D to 2D generator, a temporally-aggregated feature map by combining the feature maps based on the plurality of binary masks.

Additionally, in at least one embodiment, the series of acts 800 further include increasing, utilizing a dilated convolution layer of the 3D to 2D generator, a receptive field of the 3D to 2D generator so that the receptive field of the 3D to 2D generator is equal to a size of the digital images in the sequence of digital images. Furthermore, in at least one embodiment, the series of acts 800 include determining, utilizing a self-attention layer of the 3D to 2D generator, a correspondence between areas of the temporally-aggregated feature map by: dividing the temporally-aggregated feature map into a plurality of regions; and for each region in the plurality of regions, coordinating features of the region with features from every other region in the plurality of regions.

As shown in FIG. 8, the series of acts 800 includes an act 850 of generating a target digital image with the undesired object removed. For example, the act 850 involves generating, from the temporally-aggregated feature map utilizing a decoder of the 3D to 2D generator, a target digital image with the undesired object removed. In one or more embodiments, the series of acts 800 includes generating, from the temporally-aggregated feature map utilizing the decoder of the 3D to 2D generator, the target digital image with the undesired object removed by decoding, utilizing a plurality of gated convolutions, the temporally-aggregated feature map into the target digital image while up-sampling the temporally-aggregated feature map to a pixel size equal to a pixel size corresponding to the digital images in the sequence of digital images.

As mentioned, FIG. 9 illustrates a flowchart of a series of acts 900 for generating a target digital image based on digital images accessed from a camera viewfinder stream in accordance with one or more embodiments. While FIG. 9 illustrates acts according to one embodiment, alternative embodiments may omit, add to, reorder, and/or modify any of the acts shown in FIG. 9. The acts of FIG. 9 can be performed as part of a method. Alternatively, a non-transitory computer-readable medium can comprise instructions that, when executed by one or more processors, cause a computing device to perform the acts of FIG. 9. In some embodiments, a system can perform the acts of FIG. 9.

As shown in FIG. 9, the series of acts 900 includes an act 910 of determining an object in a camera viewfinder stream. For example, the act 910 involves determining, in response to a detected user interaction with a camera viewfinder associated with the at least one camera, an object in a camera viewfinder stream.

As shown in FIG. 9, the series of acts 900 includes an act 920 of accessing a sequence of digital images from the camera viewfinder stream. For example, the act 920 involves accessing a sequence of digital images from the camera viewfinder stream. In one or more embodiments, accessing the sequence of digital images from the camera viewfinder streams includes: accessing a first digital image representing the camera viewfinder stream at a time the user interaction was detected; and accessing a threshold number of additional digital images representing the camera viewfinder stream prior to the detected user interaction. In at least one embodiment, accessing the sequence of digital images within the temporal window is in response to a detected user interaction with the graphical user interface indicating the undesired object displayed within the graphical user interface. Additionally or alternatively, accessing the sequence of digital images within the temporal window is in response to automatically detecting the undesired object moving within a camera viewfinder stream.

As shown in FIG. 9, the series of acts 900 includes an act 930 of generating a plurality of binary masks corresponding to the sequence of digital images. For example, the act 930 involves generating, based on the object, a plurality of binary masks corresponding to the sequence of digital images by identifying pixels corresponding to the object in each digital image in the sequence of digital images. In one or more embodiments, generating the plurality of binary masks includes, for each digital image in the sequence of digital images: generating a monochromatic binary mask with pixel dimensions equal to pixel dimensions of the digital image; and inverting a color of pixels in a region of the monochromatic binary mask that corresponds to the pixels corresponding to the object in the digital image. In at least one embodiment, the series of acts 900 further includes concatenating each digital image in the sequence of digital images with a corresponding binary mask based on a location of the object in each digital image by overlaying an inverted region of pixels from the binary mask on the digital image.

As shown in FIG. 9, the series of acts 900 includes an act 940 of extracting a feature map from each of the digital images in the sequence of digital images. For example, the act 940 involves extracting, utilizing a 3D encoder of a 3D to 2D generator, a feature map from each of the digital images in the sequence of digital images.

As shown in FIG. 9, the series of acts 900 includes an act 950 of generating a temporally-aggregated feature map based on the extracted feature maps. For example, the act 950 involves generating, utilizing a temporal fusion layer of the 3D to 2D generator, a temporally-aggregated feature map by combining spatial-temporal features across the extracted features maps to fill-in holes representing the object in the temporally-aggregated feature map.

In one or more embodiments, the series of acts 900 further includes, in response to generating the temporally-aggregated feature map, refining one or more spatial-temporal features of the temporally-aggregated feature map by: increasing, utilizing a dilated convolution layer of the 3D to 2D generator, a receptive field of the 3D to 2D generator; and modifying, utilizing a self-attention layer of the 3D to 2D generator, one or more regions of the temporally-aggregated feature map to increase a feature-level correspondence between the one or more regions of the temporally-aggregated feature map.

As shown in FIG. 9, the series of acts 900 includes an act 960 of generating a target digital image with the object removed. For example, the act 960 involves generating, from the temporally-aggregated feature map utilizing a decoder of the 3D to 2D generator, a target digital image with the object removed.

As shown in FIG. 9, the series of acts 900 includes an act 970 of displaying the target digital image via the camera viewfinder. For example, the act 970 involves displaying the target digital image with the object removed via the camera viewfinder. In at least one embodiment, the target digital image comprises a last digital image in the temporal window with a region of pixels corresponding to the undesired object in-painted such that the in-painted region of pixels blends in with surrounding regions in the target digital image.

In one or more embodiments, the series of acts 900 includes an act of learning parameters the 3D to 2D generator as part of a 3D to 2D generative adversarial neural network by: accessing learning digital images concatenated with pre-determined binary masks and corresponding ground truth target digital images; generating a temporal window comprising the learning digital images concatenated with pre-determined binary masks; generating, utilizing the 3D to 2D generator, a synthesized target digital image based on the temporal window; generating, utilizing a discriminator, a prediction indicating whether the synthesized target digital image is a positive sample or a negative sample; determining an adversarial loss based on whether the prediction is correct; and modifying one or more parameters of the 3D to 2D generator and one or more parameters of the discriminator based on the adversarial loss.

Additionally, in one or more embodiments, the series of acts 900 includes an act of determining a reconstruction loss associated with the 3D to 2D generator by determining, utilizing an L1 pixel distance function, the reconstruction loss between the synthesized target digital image and the corresponding ground truth target digital image based on an amount of pixel loss between: missing regions between the synthesized target digital image and the corresponding ground truth target digital image, and normalized valid regions between the synthesized target digital image and the corresponding ground truth target digital image.

Furthermore, in one or more embodiments, the series of acts 900 includes an act of determining a perceptual loss associated with the 3D to 2D generator by: extracting a first activated feature map based on the synthesized target digital image; extracting a second activated feature map based on the corresponding ground truth target digital image; determining L1 feature distances between features of the first activated feature map and the features of the second activated feature map; and determining the perceptual loss based on the L1 feature distances. In at least one embodiment, the series of acts 900 includes an act of additionally learning parameters of the 3D to 2D generator by: determining a combination of the adversarial loss, the reconstruction loss, and the perceptual loss; and modifying one or more parameters of the 3D to 2D generator based on the combination.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media are any available media that is accessible by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which are used to store desired program code means in the form of computer-executable instructions or data structures and which are accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media includes a network and/or data links which are used to carry desired program code means in the form of computer-executable instructions or data structures and which are accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 10:
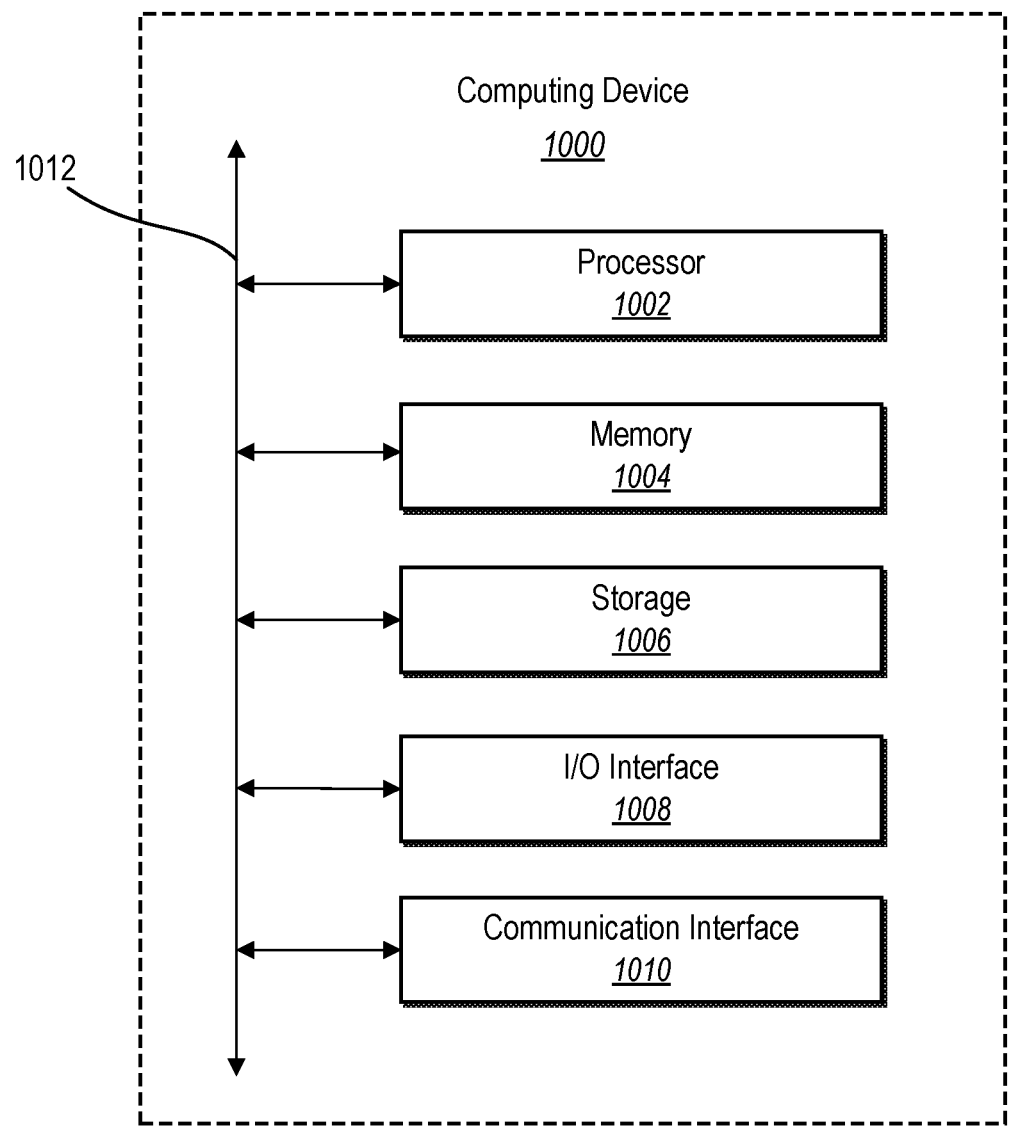
FIG. 10 illustrates a block diagram of an example computing device for implementing one or more embodiments of the present disclosure.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106, the client device 108). In one or more embodiments, the computing device 1000 may be a mobile device (e.g., a mobile telephone, a smartphone, a PDA, a tablet, a laptop, a camera, a tracker, a watch, a wearable device, etc.). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 includes one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example, and not by way of limitation, the storage device 1006 includes a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 includes hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 includes hardware, software, or both that connects components of computing device 1000 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
   providing, via a client device, a camera viewfinder display showing a camera stream comprising a series of initial digital images of a scene being captured by a camera of the client device;
   identifying an undesired object from the camera stream shown in the camera viewfinder display;
   generating, from the series of initial digital images and utilizing a neural network, a series of target digital images with the undesired object removed;

replacing the series of initial digital images of the camera stream in the camera viewfinder display with the series of target digital images to provide a preview stream of the scene being captured by the camera with the undesired object removed; and capturing a target digital image from the series of target digital images with the undesired object removed in response to a selection of an image capture button.

2. The method as recited in claim 1, further comprising:
generating a mask of the undesired object; and
erasing the undesired object by in-painting the mask of the undesired object.

3. The method as recited in claim 1, wherein identifying the undesired object from the camera stream shown in the camera viewfinder display comprises detecting a user selection of the undesired object.

4. The method as recited in claim 1, wherein identifying the undesired object from the camera stream shown in the camera viewfinder display comprises detecting that the undesired object is a moving object.

5. The method as recited in claim 1, wherein generating, from the series of initial digital images and utilizing the neural network, the series of target digital images with the undesired object removed comprises:
extracting, utilizing an encoder of the neural network, feature maps from digital images in the series of initial digital images from the camera stream;
generating, utilizing the neural network, a temporally-aggregated feature map by combining the feature maps; and
generating, from the temporally-aggregated feature map, utilizing a decoder of the neural network, the series of target digital images with the undesired object removed.

6. The method as recited in claim 5, wherein the neural network comprises a three-dimensional (3D) to two-dimensional (2D) generator.

7. The method as recited in claim 6, wherein generating, utilizing the neural network, the temporally-aggregated feature map comprises utilizing a temporal fusion layer of the 3D to 2D generator to combine the features maps.

8. A non-transitory computer-readable medium storing executable instructions, which when executed by a processing device, cause the processing device to perform operations comprising:
providing, via a client device, a camera viewfinder display showing a camera stream comprising a series of initial digital images of a scene being captured by a camera of the client device;
identifying an undesired object from the camera stream shown in the camera viewfinder display;
generating, from the series of initial digital images and utilizing a neural network, a series of target digital images with the undesired object removed;
replacing the series of initial digital images of the camera stream in the camera viewfinder display with the series of target digital images to provide a preview stream of the scene being captured by the camera with the undesired object removed.

9. The non-transitory computer-readable medium as recited in claim 8, wherein the operations further comprise:
generating a mask of the undesired object; and
erasing the undesired object by in-painting the mask of the undesired object.

10. The non-transitory computer-readable medium as recited in claim 8, wherein identifying the undesired object from the camera stream shown in the camera viewfinder display comprises detecting a user selection of the undesired object.

11. The non-transitory computer-readable medium as recited in claim 8, wherein identifying the undesired object from the camera stream shown in the camera viewfinder display comprises detecting that the undesired object is a moving object.

12. The non-transitory computer-readable medium as recited in claim 8, wherein generating, from the series of initial digital images and utilizing the neural network, the series of target digital images with the undesired object removed comprises:
extracting, utilizing an encoder of the neural network, feature maps from digital images in the series of initial digital images from the camera stream;
generating, utilizing the neural network, a temporally-aggregated feature map by combining the feature maps; and
generating, from the temporally-aggregated feature map, utilizing a decoder of the neural network, the series of target digital images with the undesired object removed.

13. The non-transitory computer-readable medium as recited in claim 12, wherein the neural network comprises a three-dimensional (3D) to two-dimensional (2D) generator.

14. The non-transitory computer-readable medium as recited in claim 13, wherein generating, utilizing the neural network, the temporally-aggregated feature map comprises utilizing a temporal fusion layer of the 3D to 2D generator to combine the features maps.

15. A system comprising:
one or more memory components; and
one or more processing devices coupled to the one or more memory components, the one or more processing devices to perform operations comprising:
providing, via a client device, a camera viewfinder display showing a camera stream of a scene being captured by a camera of the client device;
identifying an undesired object from the camera stream shown in the camera viewfinder display;
generating, utilizing a neural network, a series of target digital images with the undesired object removed;
replacing the camera stream in the camera viewfinder display with the series of target digital images to provide a preview stream of the scene being captured by the camera with the undesired object removed; and
capturing a target digital image with the undesired object removed in response to a selection of an image capture button.

16. The system of claim 15, wherein replacing the camera stream in the camera viewfinder display with the series of target digital images is performed prior to capturing the target digital image to provide a preview of edited results prior to capturing the target digital image.

17. The system as recited in claim 15, wherein identifying the undesired object from the camera stream shown in the camera viewfinder display comprises detecting a user selection of the undesired object.

18. The system as recited in claim 15, wherein:
providing the camera viewfinder display showing the camera stream of the scene comprises providing a series of initial digital images of the scene; and
generating the series of target digital images comprises generating, from the series of initial digital images, the series of target digital images with the undesired object removed.

19. The system as recited in claim 18, wherein generating, utilizing the neural network, the series of target digital images with the undesired object removed comprises:
- extracting, utilizing an encoder of the neural network, feature maps from digital images in the series of initial digital images from the camera stream;
- generating, utilizing the neural network, a temporally-aggregated feature map by combining the feature maps; and
- generating, from the temporally-aggregated feature map, utilizing a decoder of the neural network, the series of target digital images with the undesired object removed.

20. The system as recited in claim 19, wherein:
- the neural network comprises a three-dimensional (3D) to two-dimensional (2D) generator; and
- generating, utilizing the neural network, the temporally-aggregated feature map comprises utilizing a temporal fusion layer of the 3D to 2D generator to combine the features maps.

* * * * *